United States Patent
Pelczynski

(10) Patent No.: US 9,364,875 B2
(45) Date of Patent: Jun. 14, 2016

(54) SASH POSITION SENSOR USING IMAGE ANALYSIS

(71) Applicant: Siemens Industry, Inc., Alpharetta, GA (US)

(72) Inventor: Paul E. Pelczynski, Lake Zurich, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 735 days.

(21) Appl. No.: 13/631,355

(22) Filed: Sep. 28, 2012

(65) Prior Publication Data

US 2014/0092239 A1    Apr. 3, 2014

(51) Int. Cl.
*H04N 7/18* (2006.01)
*B08B 15/02* (2006.01)
*G06T 7/00* (2006.01)
*G06T 7/60* (2006.01)

(52) U.S. Cl.
CPC ............. *B08B 15/023* (2013.01); *G06T 7/0085* (2013.01); *G06T 7/602* (2013.01); *G06T 2207/30108* (2013.01)

(58) Field of Classification Search
None
See application file for complete search history.

(56) References Cited

U.S. PATENT DOCUMENTS

| 6,739,967 | B2 * | 5/2004 | Saito et al. ........................ 454/61 |
| 2005/0024216 | A1 * | 2/2005 | Crooks et al. ................. 340/606 |
| 2005/0048900 | A1 | 3/2005 | Scholten |

FOREIGN PATENT DOCUMENTS

| EP | 0541864 A1 | 5/1993 |
| EP | 1745866 A1 | 1/2007 |
| WO | 00/33983 A1 | 6/2000 |

OTHER PUBLICATIONS

PCT Search Report dated Jan. 7, 2014, for PCT Application No. PCT/US2013/060274. (10 pages).

* cited by examiner

*Primary Examiner* — Chikaodili E Anyikire

(57) ABSTRACT

Systems and methods for determining the area of a sash opening in a fume hood formed by at least one movable sash panel. Fume hoods have sash panels mounted over a hood opening to an enclosure structure of the fume hood. The sash panels are moved to open or close the fume hood at the sash opening for access to a work surface. A camera is mounted in a fume hood enclosure space to capture an image of the sash opening. An area determining function is configured to receive a digital representation of the image. The image is analyzed by detecting edges in the image. The image edges corresponding to edges of the sash opening are identified. The area of the sash opening is determined by applying a scaling value to the area formed by the image edges corresponding to the area of the sash opening.

20 Claims, 16 Drawing Sheets

SASH POSITION SENSOR USING IMAGE ANALYSIS

CROSS-REFERENCE TO RELATED APPLICATION

Reference is made to U.S. patent application Ser. No. 13/631,355, titled "Sash Position Sensor," by inventor Keith McIlhany, which is being filed on the same day as this application. The contents of the related application are incorporated by reference herein.

TECHNICAL FIELD

The present invention relates generally to fume hoods, and more particularly, to systems and methods for determining the position of a fume hood sash.

BACKGROUND

A fume hood is a ventilated structure that provides a controlled space in which a chemist performs experiments with potentially toxic chemicals. The controlled space is partially enclosed in the fume hood structure, which limits exposure to chemicals, as well as other noxious fumes, vapors, or dust as the chemist works while positioned outside of the fume hood. The chemist is provided access to the controlled space through a sash opening. The sash opening can be adjusted by moving sash panels (also referred to as fume hood doors, sash doors, sashes) that adjustably cover an opening in the fume hood. An exhaust fan draws air from the room through the sash opening into the work area in the controlled space. The air is then vented outside of the building by the exhaust fan thereby removing the fumes, vapors or dust. The amount of air required to contain the chemicals is related to the open area of the sashes that are between the user and the chemicals. The greater the open area, the more air flow that is required to contain the chemicals.

The area of the sash opening in fume hoods may be controlled by the user. Fume Hood Controllers are being provided to measure the position of each sash panel, and to use the sash positions to determine the total open area of the fume hood. The Fume Hood Controller then uses the total open area, the measured exhaust flow, and the user-defined face velocity set point to maintain the required volume of airflow through the fume hood. The required volume of airflow is the volume of airflow that is sufficient to maintain the chemicals in the fume hood.

Fume hood controllers typically include a suitable processor and supporting memory, and permits entry and storage of the dimensions of the sash panels and other structural features. A sensor or multiple sensors are provided at strategic locations in the fume hood to determine the position of each sash. The open area of the fume hood is determined using the position of the sashes and the dimensions of the structure according to the geometry of the sash opening and fume hood.

The sensors used to detect the positions of the sashes typically require attachment or mounting by rather complex structure that is typically difficult to install. One example sensor structure uses conductive strips layered opposite a resistive strip and adhesively mounted on an edge of a sash. An actuator block is movably mounted in a track on a base member mounted to the fume hood and extending along a length in parallel with, and in suitably close proximity to, the edge of the sash. The actuator block is linked to a mounting block affixed to the sash such that when the sash panel moves, the linkage moves the actuator block in the track of the base member. As the actuator block moves within the base member, a steel ball that is spring loaded in the actuator block presses the conductive strips together. The conductive strips are energized in a voltage divider circuit and when the steel ball presses on the conductive strips, a short circuit is created and the position of the steel ball may be determined by taking voltage measurements.

Another way of sensing the position of fume hood sashes involves positioning a string of light emitters and corresponding detectors on a surface of the fume hood in proximity to one side of a sash. The light emitter and detector pairs are mounted along the length of one side of the sash and the detector is connected in parallel with a resistor. The string of light emitters and corresponding detectors is energized and the signal level at the end of the series connection of emitters is monitored. When the sash is present at a given light emitter, the light from the emitter is reflected off the side of the sash and the reflected light is detected by its corresponding light detector. When the detector senses the light reflected off the sash surface, the resistor in parallel with it is bypassed causing a corresponding change in the signal level across the series connection of the detectors. The signal level changes as the sash moves and provides an indication of the position of the sash.

Another way of sensing the position of the fume hood sashes involves mounting a string potentiometer to the fume hood. An end of the string potentiometer is fixed to the sash so that the sash pulls the string and changes the resistance on the potentiometer. A voltage measurement determines the extent to which the sash has pulled the string and when properly calibrated, provides the position of the sash.

The apparatuses and methods currently used for determining the position of the sash on a fume hood suffer from requiring mounting structure for sensing mechanisms that is difficult to install. The apparatuses and methods are also difficult to calibrate. The difficulty in installing and calibrating the sensing mechanisms affect the reliability, cost and robustness of the position sensing apparatuses.

In view of the foregoing, there is an ongoing need for systems, apparatuses and methods for determining the position of sashes on fume hoods that involve structure that is easy to install and calibrate.

SUMMARY

In view of the above, a system is provided for determining the area of a sash opening in a fume hood. The sash opening is formed by at least one movable sash panel mounted over a hood opening to an enclosure structure of the fume hood. The sash panel reduces the area of the sash opening when the at least one sash panel is moved in one direction. The sash panel is moved to expand the area of the sash opening when moved in the other direction thus providing access to a work surface in the fume hood enclosure space. In an example system, a camera is mounted in a fume hood enclosure space to capture an image of the sash opening. The system includes an area determining function configured to receive a digital representation of the image. The area determination function analyzes the image by detecting edges in the image. Image edges corresponding to edges of the sash opening are identified. The area of the sash opening is determined by applying a scaling value to the area formed by the image edges corresponding to the area of the sash opening.

In another aspect, a method is provided for determining an area of the sash opening in the fume hood. In an example method, a camera is provided in the fume hood enclosure structure and positioned to include the hood opening in a field of view of the camera. An image of the sash opening is captured and image edges are detected in a digital representation of the captured image. The image edges in the digital representation that correspond to edges of the sash opening are identified. The area of the sash opening is determined based on real lengths of the edges of the sash opening by applying a scaling value that translates a number of pixels to a real length.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

As used herein, the term "sash" refers to a movable panel or door positioned to cover a fume hood opening where movement of the sash varies the area of the fume hood opening.

As used herein, the term "sash opening" refers to the fume hood opening defined by the position of the sash panel where the maximum area of the fume hood opening is defined by the area of the fume hood opening with the sash panels positioned at a maximum open position.

I. Fume Hoods and Fume Hood Sashes

Figure 1A:
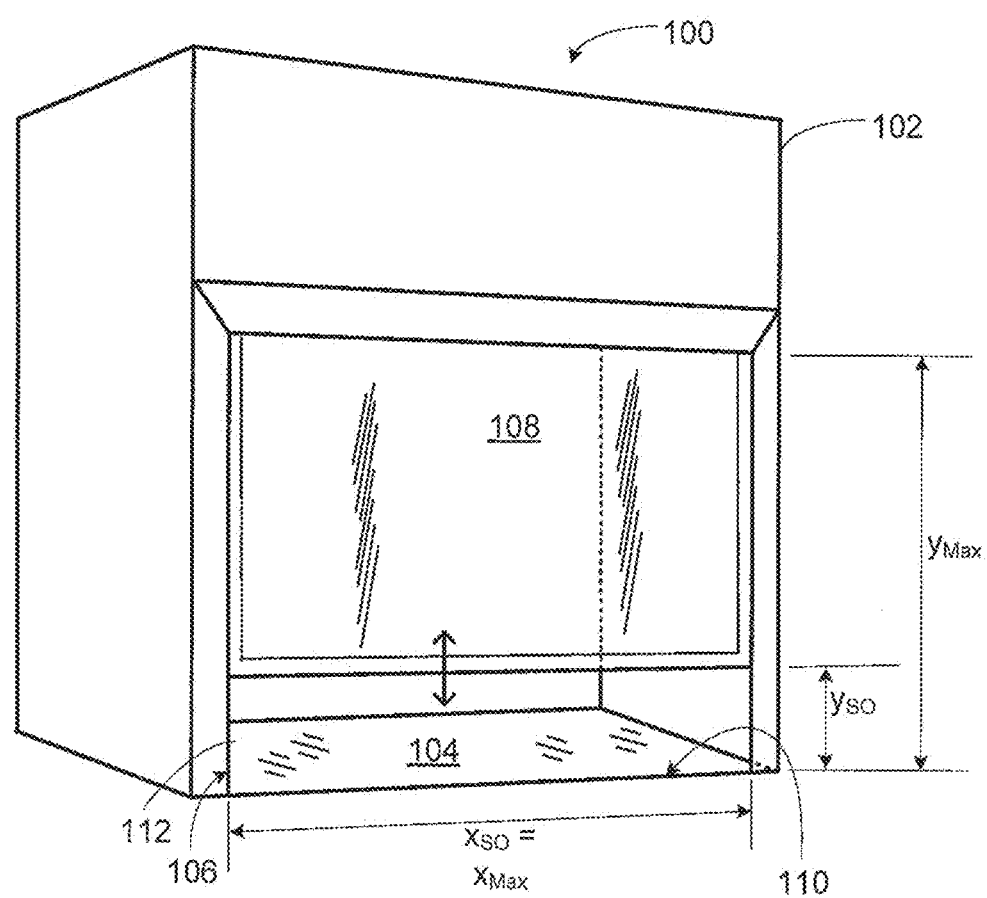
FIGS. 1A-1C are perspective illustrations of examples of fume hoods in which example implementations of systems and methods for determining a sash-opening area may be implemented.
Figure 1B:
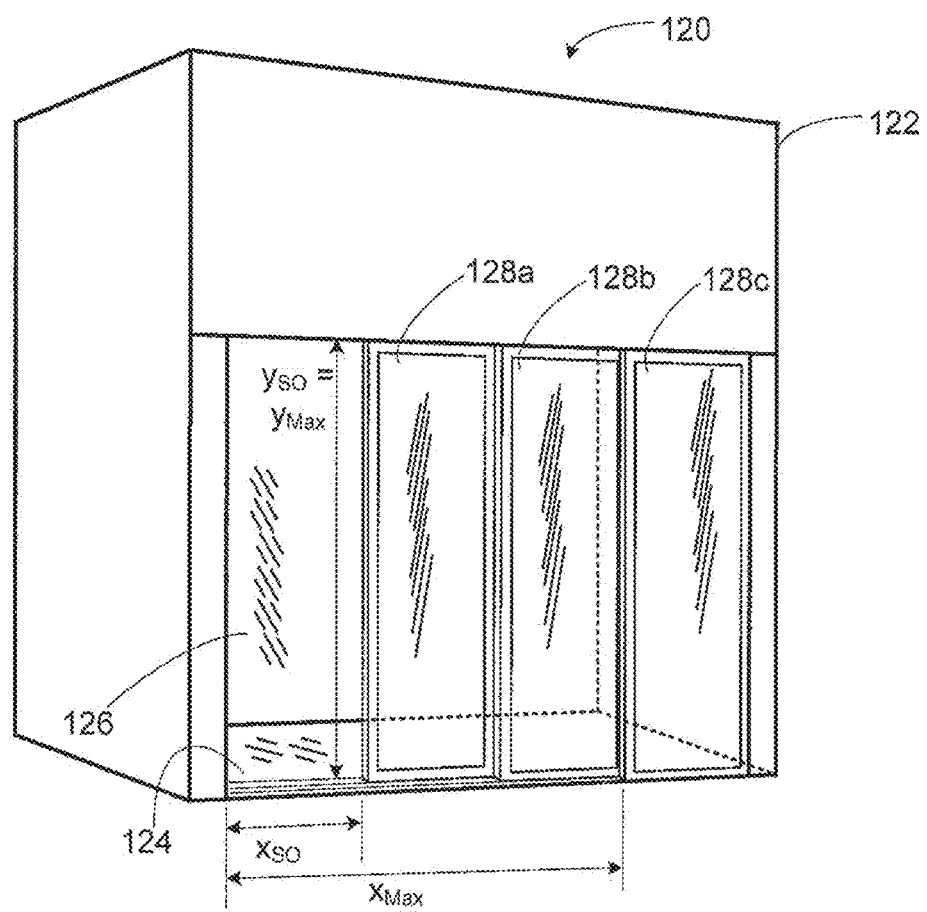
Figure 1C:
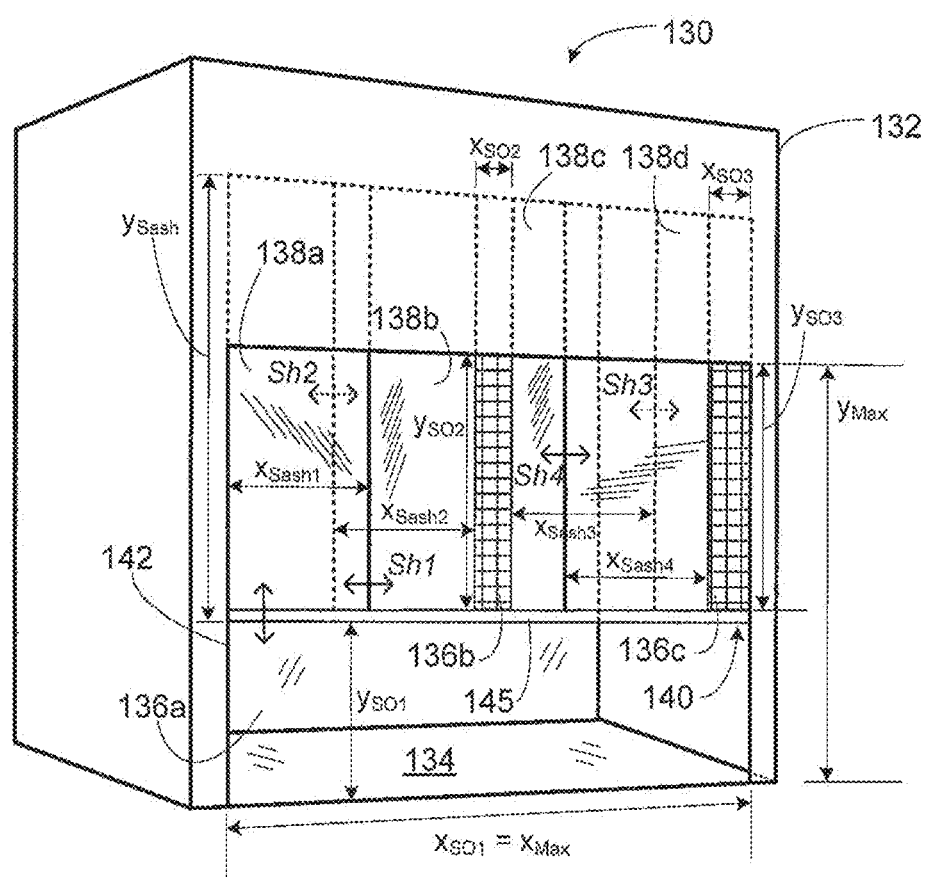

FIGS. 1A-1C are perspective illustrations of examples of fume hoods in which example implementations of systems and methods for determining a sash-opening area may be implemented. FIG. 1A shows a first fume hood 100 comprising an enclosure structure 102, a work surface 104, and a vertically movable sash panel 108. The enclosure structure 102 encloses the area of the work surface 104 on which work involving toxic or noxious fumes, vapors, and/or dust may be performed. A hood opening 106 provides access to the work surface 104. The hood opening 106 may be defined by a cutout in a front side or other side of the enclosure structure 102 having a vertical or longitudinal dimension of "$y_{Max}$" and a horizontal or latitudinal dimension of "$x_{Max}$" as shown in FIG. 1A. The vertically movable sash panel 108 is used to open or close the hood opening 106. In the example implementation shown in FIG. 1A, the sash panel 108 moves in a vertical direction such that the sash panel 108 is spaced above an edge 110 of the work surface 104 to form a sash opening 112 (as portion of hood opening 106) having a sash opening height of $y_{SO}$, which has a value within the range of 0 to $y_{Max}$ for providing access to the work surface 104.

The fume hood 100 is connected to an exhaust fan and damper arrangement by ductwork (not shown in the Figures). The exhaust fan serves to draw air from the room through the sash opening 112, the interior of the enclosure structure 102, the ductwork and the damper. The air is then vented outside of the building by the exhaust fan thereby removing fumes, vapors or dust. A fume hood controller (not shown in FIGS. 1A-1C) may be included in or near the fume hood 100 to maintain the speed of the air (referred to herein as the face velocity) drawn through the fume hood 100 within a desired air speed range. If the face velocity is too low, there may be insufficient venting of the work surface 104. If the face velocity is too high, undesirable air turbulence is generated, which may cause movement of the contaminants into a worker's breathing zone. An acceptable range for the face velocity may vary between approximately 60-120 feet per minute (fpm) depending on the type of hood and hazard.

The fume hood controller may be configured to control the exhaust fan or fans, and dampers to keep the face velocity in the proper range. The face velocity may vary however, based on the area or size of the sash opening 112. In order to maintain the face velocity within the desired range given that the sash panel 108 is movable, the speed of the exhaust fan and/or associated damper must be adjusted to take into account the current size of the sash opening 112. For example, the speed of the exhaust fan is increased or a damper opening is increased as the size of the sash opening 112 is increased. Conversely, the speed of the exhaust fan is decreased or the damper opening is decreased as the size of the sash opening 112 is decreased. Similarly, the speed of the exhaust fan and/or associated damper must be adjusted to take into account the size of the sash opening 112 for the configuration shown in FIG. 1A.

The area of the sash opening 112 may be determined using systems and methods incorporating a camera as described below. The systems and methods described below may be implemented in fume hoods such as the fume hood 120 shown in FIG. 1B and the fume hood 130 shown in FIG. 1C.

The fume hood 120 shown in FIG. 1B includes an enclosure structure 122 similar to that of the fume hood 100 in FIG.

1A, and sash panels 128a, 128b that move horizontally to provide a sash opening 126 to access a work surface 124. The sash opening 112 shown in FIG. 1B has a width $x_{SO}$ from 0 to $x_{Max}$. The sash opening 112 has a fixed height of $y_{Max}$.

The fume hood 130 shown in FIG. 1C includes an enclosure structure 132 similar to that of the fume hood 100 in FIG. 1A and a combination sash structure having horizontally movable sash panels 138a, 138b, 138c, 138d mounted in a vertically movable sash section 140 to provide a first sash opening 136a to access a work surface 134. The vertically movable sash section 140 and the horizontally movable sash panels 138a, 138b, 138c, 138d are movable to open or close a hood opening 142, which is formed by the opening in the enclosure structure 132 of the fume hood 130 without the sash section 140 and the sash panels 138b, 138c, 138d.

The vertically movable sash section 140 may be moved up or down to open or close the first sash opening 136a. The area of the sash opening 136a is varied by moving the vertically movable sash section 140 up or down. Additional sash openings may be formed by moving the horizontally movable sash panels 138a, 138b, 138c, and 138d. FIG. 1C shows the horizontal mobility of the first horizontally movable sash panel 138a at arrow Sh1. The horizontal mobility of the second horizontally movable sash panel 138b at arrow Sh2. The horizontal mobility of the third horizontally movable sash panel 138c at arrow Sh3. The horizontal mobility of the fourth horizontally movable sash panel 138d at arrow Sh4. The horizontally movable sash panels 138a, 138b, 138c, 138d may move on individual tracks to any position along the width of the hood opening 142. The tracks on which the horizontally movable sash panels 138a, 138b, 138c, 138d travel may be formed in a panel support structure 145, which supports the horizontally movable sash panels 138a, 138b, 138c, 138d when the vertically movable sash section 140 is moved up or down.

The first sash opening 136a shown in FIG. 1C has a width $x_{SO1}$ from 0 to $x_{Max}$ and a height $y_{SO1}$ from 0 to $y_{Max}$, where $x_{Max}$ is the width dimension of the hood opening 142, and $y_{Max}$ is the height dimension of the hood opening 142. The freedom of movement of horizontally movable sash panels 138a, 138b, 138c, and 138d may cause multiple openings in the hood opening 142. For example, a second opening 136b (SO2) may be formed between the edges of sash panel 138b and 138c. A third opening 136c (SO3) may also be formed when the right-most sash panel 138d is moved from the right most edge of the hood opening 142. The areas of the sash openings 136b and 136c may be determined from the dimensions of each. The second sash opening 136b has a variable width $x_{SO2}$ between edges of the two horizontally movable sash panels 138b and 138c that form the two edges of the area of the sash opening 136b that are movable horizontally. The third sash opening 136c has a variable width $x_{SO3}$ between the right edge of the horizontally movable sash panel 138d and the edge of the hood opening 142, which form the at least one edge of the area of the sash opening 136c that is movable horizontally. The vertical dimension of the second sash opening $y_{SO2}$ and of the third sash opening $y_{SO3}$ is the same value, which may vary between 0 and the vertical dimension of the sash panels, $y_{sash}$. The value, $y_{SO2}$, of the vertical dimension of the second sash opening $y_{SO2}$ and of the third sash opening $y_{SO3}$ is the distance between the bottom edge of the second and third sash openings 136b & 136c and the top edge of the hood opening 142.

The sash opening area may be determined for the sash openings in the fume hoods shown in FIGS. 1A, 1B, and 1C by determining an area of a rectangle formed by the edges around the sash opening shown in each drawing, and adding the areas of the multiple rectangles when more than one sash opening is formed. The rectangle of the sash opening in each fume hood 100, 120, 130 has an area $A(x,y)=x_{SO} \cdot y_{SO}$. Example implementations of systems and methods for determining the area of a sash opening using an image from a camera are described below. It is noted that the examples described below are for a fume hood similar to the fume hood 100 in FIG. 1A in which a vertically movable sash 108 is used to vary the sash opening 112. Those of ordinary skill in the art will understand that the examples described herein may be similarly implemented in fume hoods having openings regardless of how they are formed.

II. Sash Opening Area Detection Methods Using Imaging

Figure 2A:
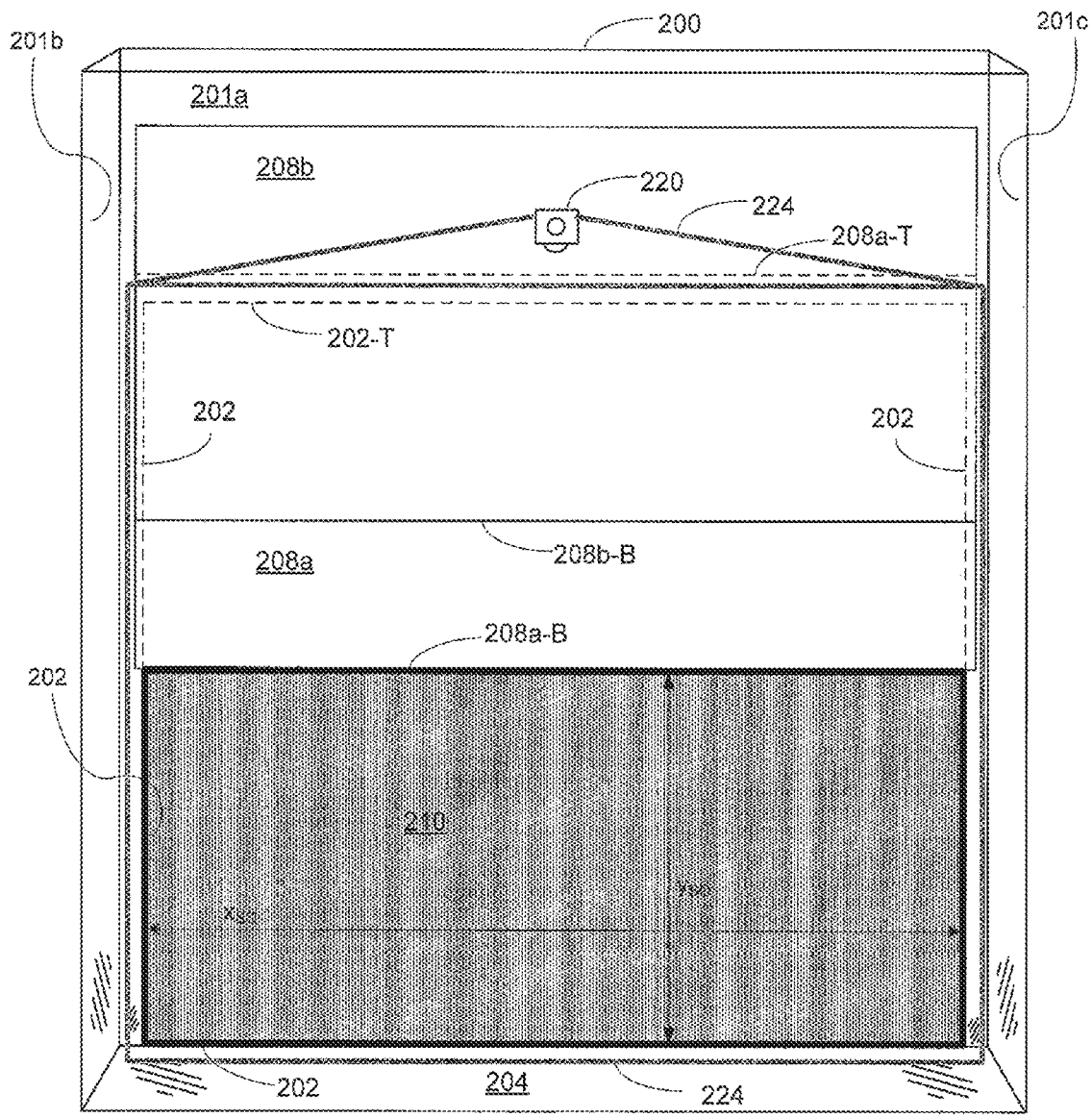
FIGS. 2A and 2B—are transparent rear perspective views of an example of a fume hood having two vertically movable sash panels.
Figure 2B:
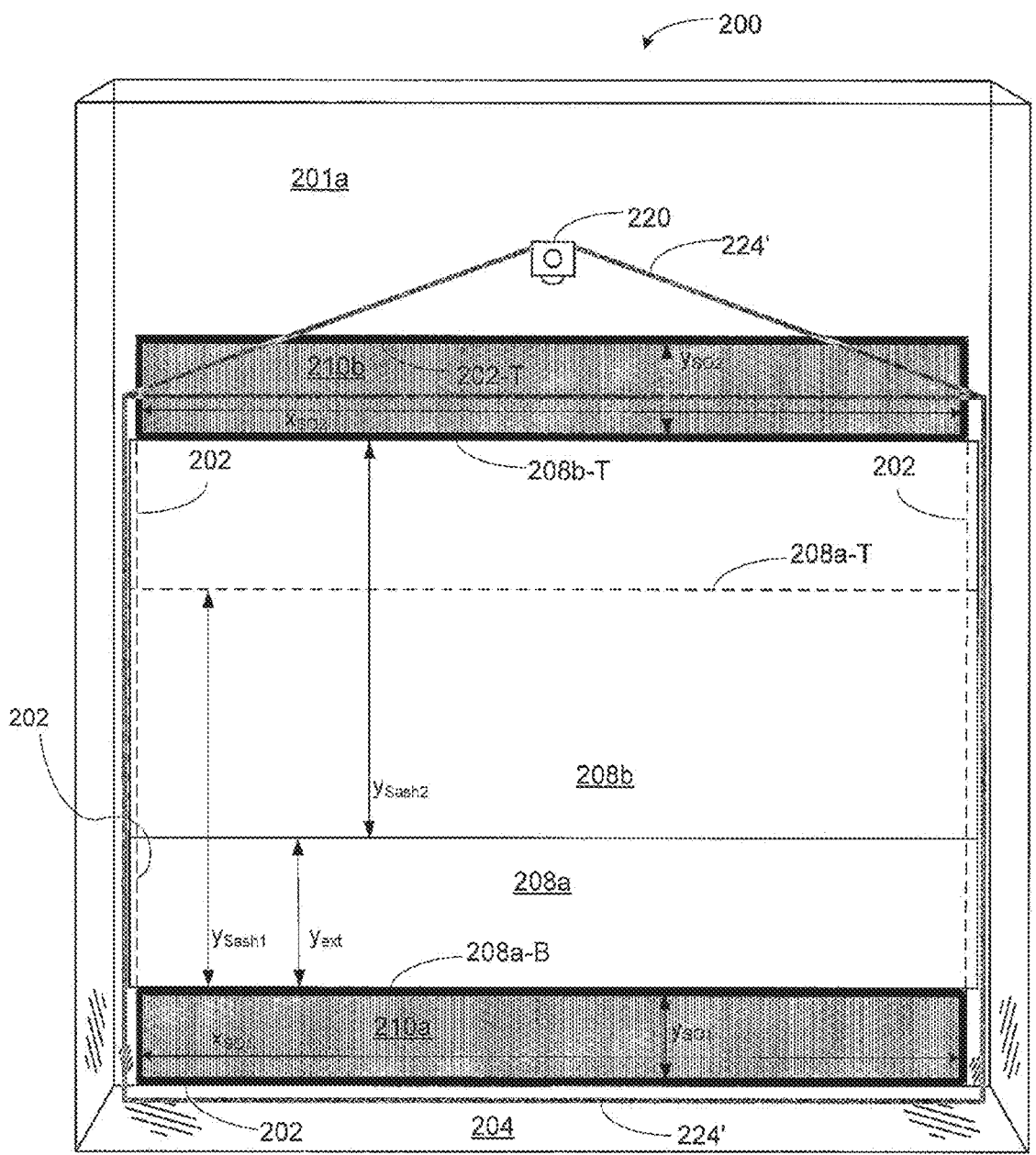
Figure 3:
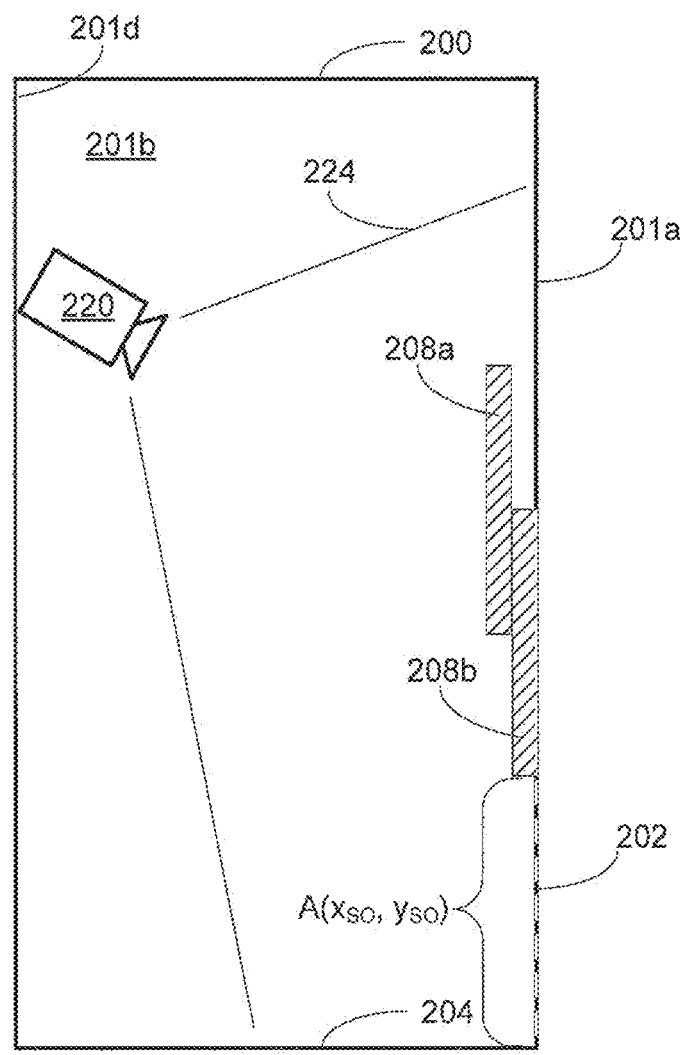
FIG. 3 is a cross-sectional side view of the fume hood in FIG. 2A.

FIGS. 2A and 2B are transparent rear perspective views of an example of a fume hood with an enclosure space 200 that uses two vertically movable sash panels 208a & 208b to provide an opening to access a work space 204. FIG. 3 is a cross-sectional side view of the fume hood illustrated in FIG. 2A. Referring to FIGS. 2A and 3, the enclosure space 200 is formed by a front inner wall 201a, a left inner wall 201b, a right inner wall 201c, and a rear inner wall 201d within the enclosure structure of the fume hood. A hood opening 202 is formed on the front inner wall 201a of the enclosure structure 200. The top edge of the hood opening 202 is indicated by reference number 202-T. A first vertically movable sash 208a and a second vertically movable sash 208b are illustrated as movable along the front inner wall 201a of the enclosure structure 200 to vary the area, $A(x_{SO}, y_{SO})$, of a sash opening 210. The work surface 204 forms the bottom of the enclosure space 200 and accessed by users via the sash opening 210.

It is noted that the sash panels 208a & 208b may be mounted on either the inner side of the front inner wall 201a as shown in FIGS. 2A and 3, or on the outer side of the front inner wall 201a. In addition, only two sash panels 208a & 208b are shown in FIGS. 2A and 3. However, only one, or more than two sash panels may be provided. The sash panels 208a & 208b may be configured to provide a single sash opening 210. However, the sash panels 208a & 208b may be configured to be movable in a manner that may create one or more sash openings as discussed below with reference to FIG. 2B.

The enclosure space 200 in FIGS. 2A and 3 includes a camera 220 mounted on the rear inner wall 201d. The camera 220 in FIGS. 2A and 3 is mounted at a position above the hood opening 202 and aimed towards the front inner wall 201a. The camera 220 is configured (by aiming and focusing) such that the image captured by the camera 220 substantially encompasses the hood opening 202. The camera's field of view 224 is shown in FIGS. 2A and 3 as encompassing the entire hood opening 202. As described below with reference to FIG. 2B, example implementations may use images in which the field of view 224 of the camera 220 is smaller than the area of the hood opening 202 or of the maximum area of the sash opening 210.

The camera 220 may be a video camera, or a still image camera. The image may be captured and stored in a suitable digital format. The camera 220 may be mounted in or near an apparatus that includes a controller configured to compute an area of the sash opening 210 based on the images captured by the camera 220.

In example implementations, the area of the sash opening 210 may be determined by detecting edges in an image captured by the camera 220, determining the length of the edges in the image, and using the image length to calculate an actual length in units of length. In some implementations, only a single opening may be possible by moving the sash panels. In other implementations, the sash panels have a greater degree of movement making it possible to form more than one opening. If a fume hood is configured so that the sash panels are restricted to move such that only one opening is possible, the area of the single sash opening may be determined by identifying the edges of the area of the sash opening. The lengths of the edges using an image scale value and known information about the geometry of the sash panels and the hood opening may then be determined. The area of the sash opening may then be determined using the lengths of the edges of the area of the opening.

The example illustrated in FIG. 2A shows the sash panels 208a & 208b positioned so that only a single sash opening 210 is formed. The enclosure structure 200 may be configured to restrict the movement of the sash panels 208a & 208b so that only the single sash opening 210 is possible. The enclosure structure 200 may also be configured to allow the sash panels 208a & 208b to move so as to form multiple sash openings as shown in FIG. 2B.

Referring to FIG. 2A, the first sash panel 208a is positioned to move vertically inside the enclosure structure 200 along the hood opening 202. The second sash panel 208b is positioned to move vertically inside the enclosure structure 200 on the inner side of the first sash panel 208a. In the view shown in FIG. 2A, the first sash panel 208a moves behind the second sash panel 208b, which is indicated by the broken line representing the upper edge 208a-T of the first sash panel 208a.

The area of the sash opening 210 may be determined by the lengths of the edges forming the sash opening 210. The sash opening 210 is formed by the bottom edge of the first sash panel 208a-B, the side edges of the hood opening 202, and a line on the work surface 204 that is coplanar with the hood opening 202. The sash opening 210 is a rectangle having a horizontal dimension shown as $x_{SO}$, and a vertical dimension shown as $y_{SO}$ in FIG. 2A.

The horizontal dimension, $x_{SO}$, is determined by the length of the top edge (i.e. the bottom edge of the first sash panel 208a-T) and the length of the line on the work surface 208 that is coplanar with the hood opening 202. Of the four edges forming the area of the sash opening 210, the length of two of the edges may be a known opening edge length value, and stored either as a configuration parameter or as an otherwise predetermined parameter. Since the sash panels 208a & 208b are vertically movable, the side edges of the area of the sash opening 210, which determine the vertical dimension, $y_{SO}$, of the area of the sash opening 210, are variable length. The vertical dimension, $y_{SO}$, may be determined from the corresponding edge images in the images captured by the camera 220.

The actual length of edges forming the area of the sash opening may be determined from the edges identified as being the edges of the area of the sash opening (or openings) in images captured by the camera 220. A scaling value in pixels/unit length may be determined based on known values of dimensions of objects or patterns that appear in the image, or in a calibration step. The determination of the pixels/unit length scalar value may involve accounting for the 3-dimensional orientation of the objects in the image. The camera 220 in FIGS. 2A and 3 is fixedly mounted in a position that permits capture of the relevant images in a fixed downward direction. The motion of the sash panels 208a & 208b is limited to vertical motion in a single plane. The pixel/unit length value may be determined based on the geometry of the orientation of the sash panel 208 relative to the plane of the image captured.

If the scaling value is a constant, k, the variable length vertical dimension, $y_{SO}$, may be determined from measuring the image edge corresponding to the variable length side edges of the area of the sash opening 210, and defining the image edge length as $y_{ie}$ in pixels. The area of the sash opening 210, $A(x_{SO}, y_{SO})$, may be determined by calculating:

$$y_{SO} = k \cdot y_{ie}, \text{ and}$$

$$A(x_{SO}, y_{SO}) = x_{SO} \cdot y_{SO}.$$

In implementations where the sash panels have a greater freedom of movement, edges detected in the image may be analyzed to identify the edges of the areas of the various openings. The analysis to determine which edges form the area of the sash openings may be performed using known information and dimensions about the geometry of the sash panels and the hood opening. Referring to FIG. 2B, the sash panels 208a & 208b are configured to move with a degree of movement sufficient to permit more than one opening to form along the hood opening 202. The example illustrated in FIG. 2B shows two sash openings 210a & 210b. The first sash opening 210a is formed by the bottom edge of the first sash panel 208a-B, a line on the work surface 204 that is coplanar with the hood opening 202, and the side edges of the hood opening 202 between the bottom edge of the first sash panel 208a-B and the work surface 204. The first sash opening 210a has an area with a horizontal dimension length, $x_{SO1}$, and a vertical dimension length, $y_{SO1}$, as shown in FIG. 2B. The horizontal dimension length, $x_{SO1}$, is defined by the first sash panel bottom edge 208a-B and the line on the work surface 204 that is coplanar with the hood opening 202. The sash panels 208a & 208b are vertically movable making the horizontal dimension length, $x_{SO1}$, a constant length and the vertical dimension length, $y_{SO1}$, a variable length. The horizontal dimension length, $x_{SO1}$, and the vertical dimension length, $y_{SO1}$, are used, with a constant scaling value, $k_{ie}$, to determine the area, $A_1(x_{SO1}, y_{SO1})$, of the first sash opening 210a. Given a constant scaling value, k, the variable length vertical dimension, $y_{SO1}$, may be determined from measuring the image edge corresponding to the variable length side edges of the area of the sash opening 210a, and defining the image edge length as $y_{ie}$ in pixels. The area of the sash opening 210, $A(x_{SO1}, y_{SO1})$, may be determined by calculating:

$$y_{SO1} = k \cdot y_{ie}, \text{ and}$$

$$A(x_{SO1}, y_{SO1}) = x_{SO1} \cdot y_{SO1}.$$

The second sash opening 210b is formed by the second sash panel top edge 208b-T, the hood opening top edge 202-T, and the side edges of the hood opening 202. The edges of the second sash opening 210b form an area having a horizontal dimension length, $x_{SO2}$, and a vertical dimension length, $y_{SO2}$, as shown in FIG. 2B. The horizontal dimension length, $x_{SO2}$, is defined by the lengths of the second sash panel top edge 208b-T and the hood opening top edge 202-T. The sash panels 208a & 208b are vertically movable making the horizontal dimension length, $x_{SO2}$, a constant length and the vertical dimension length, $y_{SO2}$, a variable length. The horizontal dimension length, $x_{SO2}$, and the vertical dimension length, $y_{SO2}$, are used, with a constant scaling value, k, to determine the area, $A_2(x_{SO2}, y_{SO2})$, of the first sash opening 210b. Given a constant scaling value, k, the variable length vertical dimension, $y_{SO2}$, may be determined from measuring the image edge corresponding to the variable length side edges of the area of the sash opening 210a, and defining the image edge length as $y_{ie}$ in pixels. The area of the sash opening 210, $A(x_{SO2}, y_{SO2})$, may be determined by calculating:

$$y_{SO2} = k \cdot y_{ie}, \text{ and}$$

$$A(x_{SO2}, y_{SO2}) = x_{SO2} \cdot y_{SO2}.$$

In order to determine a face velocity based on the fume hood openings in the example shown in FIG. 2B, the area, $A_1$, is calculated, the area, $A_2$, is calculated, and the area, $A_1$, is added to the area, $A_2$. The total area, $A_1+A_2$, is then used to determine face velocity.

It is noted that in the example shown in FIG. 2B, the camera 220 may have a restricted field of view 224' that may not encompass the entire hood opening 202. This may result in images that do not capture the entire sash opening. As shown in FIG. 2B, images with the restricted field of view 224' would not capture the entire area of the second sash opening 210b, or may not capture any of the area of a sash opening that may be entirely outside of the field of view 224'. The images captured by the camera 220 may nevertheless be used to determine areas not entirely in the image or not in the image at all. The images may be analyzed to identify the first sash panel top and bottom edges 208a-T & 208a-B, and the second sash panel top and bottom edges 208b-T & 208b-B.

In some implementations, the sash panels 208a & 208b may be made of glass or some other transparent material that would permit edges behind a sash panel to appear in the images. The y dimension length for each sash panel may be stored as a known parameter for each sash panel as $y_{Sash1}$ and $y_{Sash2}$. The y dimension length between horizontal image edges that may be the top and bottom edges of each sash panel may be determined in pixels. If all of the horizontal edges shown in FIG. 2B that are candidates to be the top and bottom edges of each sash panel are visible in the image, an image analyzer function may calculate the y dimension lengths between each of the horizontal image edges and identify the two values that correspond to the known lengths, $y_{Sash1}$ and $y_{Sash2}$. In addition, the y dimension of the area covered by the sash panels 208a & 208b may also be determined based on the position of the sash panels 208a & 208b.

If the sash panels 208a & 208b are not transparent, the image may show three image edges that may be top and bottom edges of the sash panels. These three image edges may be identified, and the distances between the image edges may yield the actual distances between the edges. One of the distances corresponds to one or both of the known y dimension lengths of the sash panels 208a & 208b. This distance is the y dimension of the sash panel that is visible to the camera 220. A distance, $y_{ext}$, corresponds to a portion of the other sash panel that is on the other side, and therefore partially covered, by the sash panel that is visible to the camera 220. The distance $y_{ext}$ plus the distance $y_{Sash1}$ or $y_{Sash2}$ corresponding to the sash panel that is visible to the camera 220 provides a way of determining a total area covered by the sash panels 208a & 208b. The total area covered by the sash panels 208a & 208b may then be compared to the total area of the hood opening 202 to determine the area left open by the positions of the sash panels 208a & 208b.

It is to be noted that in some implementations, sash panels may be restricted so that positioning the sash panels 208a & 208b to its highest possible position, a portion of a sash panel may extend into the hood opening 202. The y dimension of this portion may be known, stored as a known parameter, and used in determining the open area of sash panel opening(s).

As noted above, the area of the hood opening 202 may be a known value. The lengths of all of the edges that form the area of the hood opening 202 may also be known lengths. The image processing function may identify the edges of the hood opening 202 in the image by measuring candidate image edges that are visible in the image, and comparing their lengths with the lengths of the edges of the hood opening 202. When the visible edges of the hood opening 202 are identified, the relative position of the sash panels may then be determined as well. The position of the sash panels 208a & 208b may be used in identifying the edges forming the area of each of the sash openings 210a & 210b.

The description of how images are analyzed to determine the area of sash openings with reference to FIGS. 2A and 2B above illustrate the use of known dimensions of the components of the fume hood; the geometry and orientation of the components of the fume hood may be identified as parameters. Such parameters may include, without limitation:

1. $x_{HO}$: the horizontal dimension of the hood opening 202.
2. $y_{HO}$: the vertical dimension of the hood opening 202.
3. $x_{Sashn}$: where n sash panels are used to cover the hood opening, the horizontal dimension of each of the sash panels 1–n.
4. $y_{Sashn}$: where n sash panels are used to cover the hood opening, the vertical dimension of each of the sash panels 1–n.
5. $x_{max,SO}$: Maximum horizontal dimension of the area of the sash opening when the sash panels are positioned so that the sash opening or openings have a maximum area.
6. $y_{max,SO}$: Maximum vertical dimension of the area of the sash opening when the sash panels are positioned so that the sash opening or openings have a maximum area.

Figure 2C:
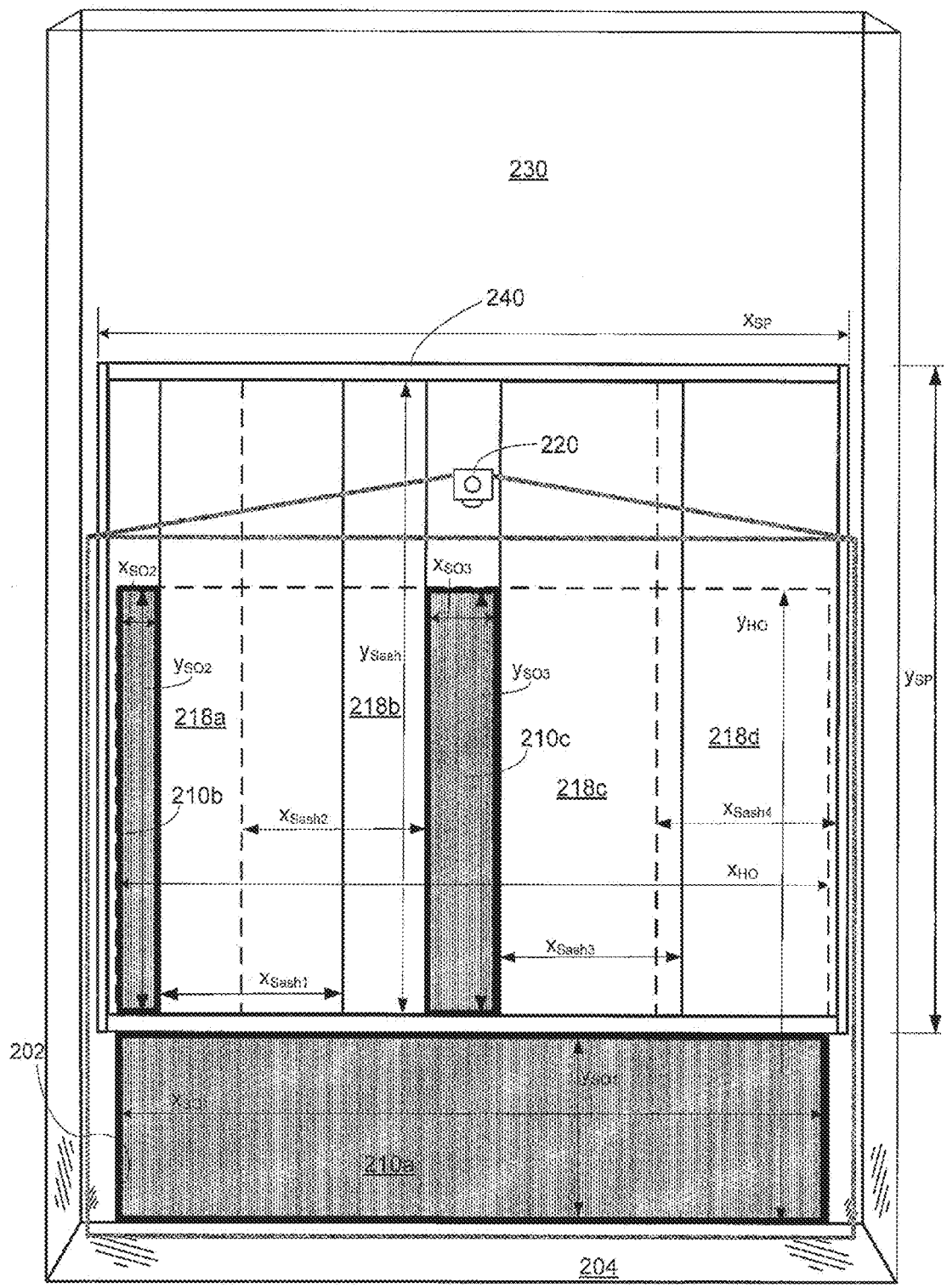
FIG. 2C is a transparent rear perspective view of an example of the fume hood of FIG. 1C.

Given the parameters indicating information about the fume hood (listed as examples above), images of the hood opening environment may be analyzed to measure edges and other lengths that may be variable. FIG. 2C shows a fume hood such as the fume hood 130 in FIG. 1C having sash panels that move in a horizontal and a vertical direction. The fume hood in FIG. 2C includes an enclosure structure 230 that includes a hood opening 202 and a work surface 204. The hood opening 202 may be covered by a vertically movable sash section 240 that includes a plurality of horizontally movable sash panels 218a, 218b, 218c, and 218d. The horizontally movable sash panels 218a, 218b, 218c, 218d are mounted in the vertically movable sash section 240 to move vertically as a unit when the sash section 240 is moved up or down.

The components of the fume hood and their dimensions, which may be used with image edge analysis to determine areas in the opening(s) in the fume hood, are listed as follows:

1. $x_{Sash1}$: horizontal dimension of first sash panel 218a.
2. $x_{Sash2}$: horizontal dimension of second sash panel 218b.
3. $x_{Sash3}$: horizontal dimension of third sash panel 218c.
4. $x_{Sash4}$: horizontal dimension of fourth sash panel 218d.
5. $y_{Sash}$: vertical dimension of first sash panel 218a.
6. $y_{Sash}$: vertical dimension of second sash panel 218b.
7. $y_{Sash}$: vertical dimension of third sash panel 218c.
8. $y_{Sash}$: vertical dimension of third sash panel 218d.
9. $x_{HO}$: horizontal dimension of the hood opening 202.
10. $y_{HO}$: vertical dimension of the hood opening 202.
11. $x_{sp}$: horizontal dimension of the sash section 240.
12. $y_{sp}$: vertical dimension of the sash section 240.

Other information may be known and defined as parameters for determining the area of sash openings, such as the position of sash panels when moved all the way to either side of the hood opening 202, as well as any other information that may involve particular details of the structure of the fume hood.

Some or all of the information listed above may be used along with edge detection and measurement of image edges to either identify components, such as the individual sash panels, or to determine the length of edges that are variable in length due to the movement and change in position of the sash panels. As the sash panels 218a, 218b, 218c, 218d in FIG. 2C are moved, a sash opening, or openings, may be formed. FIG. 2C shows three sash openings 210a, 210b, 210c formed by moving the sash section 240 and the horizontally movable sash panels 218a, 218b, 218c, 218d. The vertical movement of the sash section 240 creates a first sash opening 210a. The first sash opening 210a has a variable vertical dimension $y_{SO1}$ and a horizontal dimension $x_{SO1}$ determined by the horizontal dimension of the hood opening 202. The movement and change in position of the horizontally movable sash panels 218a, 218b, 218c, and 218d creates a second sash opening 210b and a third sash opening 210c. The second and third sash openings 210b & 210c have dimensions that are variable in both the x and y directions. The vertical dimension $y_{SO2}$ for the second sash opening 210b and $y_{SO3}$ for the third sash opening 210c vary according to the extent to which the sash section 240 is moved up or down. The two dimensions, $x_{SO2}$ and $y_{SO2}$, for the second sash opening 210b may both be measured by determining pixel lengths of the corresponding edges from the images captured by the camera 220. The two dimensions, $x_{SO3}$ and $y_{SO3}$, for the third sash opening 210c may also both be measured by determining pixel lengths of the corresponding edges from the images captured by the camera 220.

Figure 4:
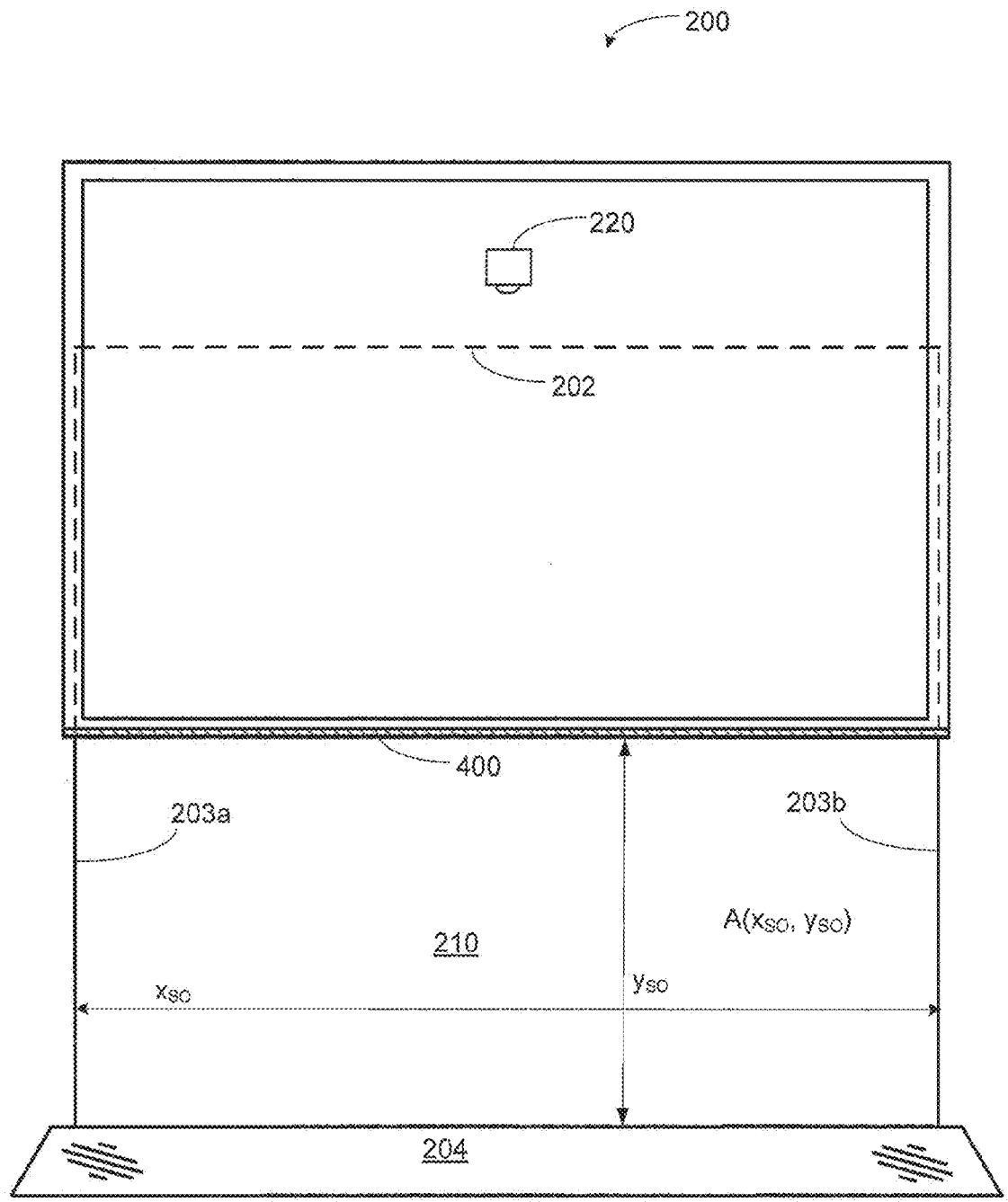
FIG. 4 is a rear perspective view of a single vertically movable sash panel and sash opening in an example fume hood illustrating use of a reflective strip to aid in detecting and measuring sash opening edges.
Figure 5:
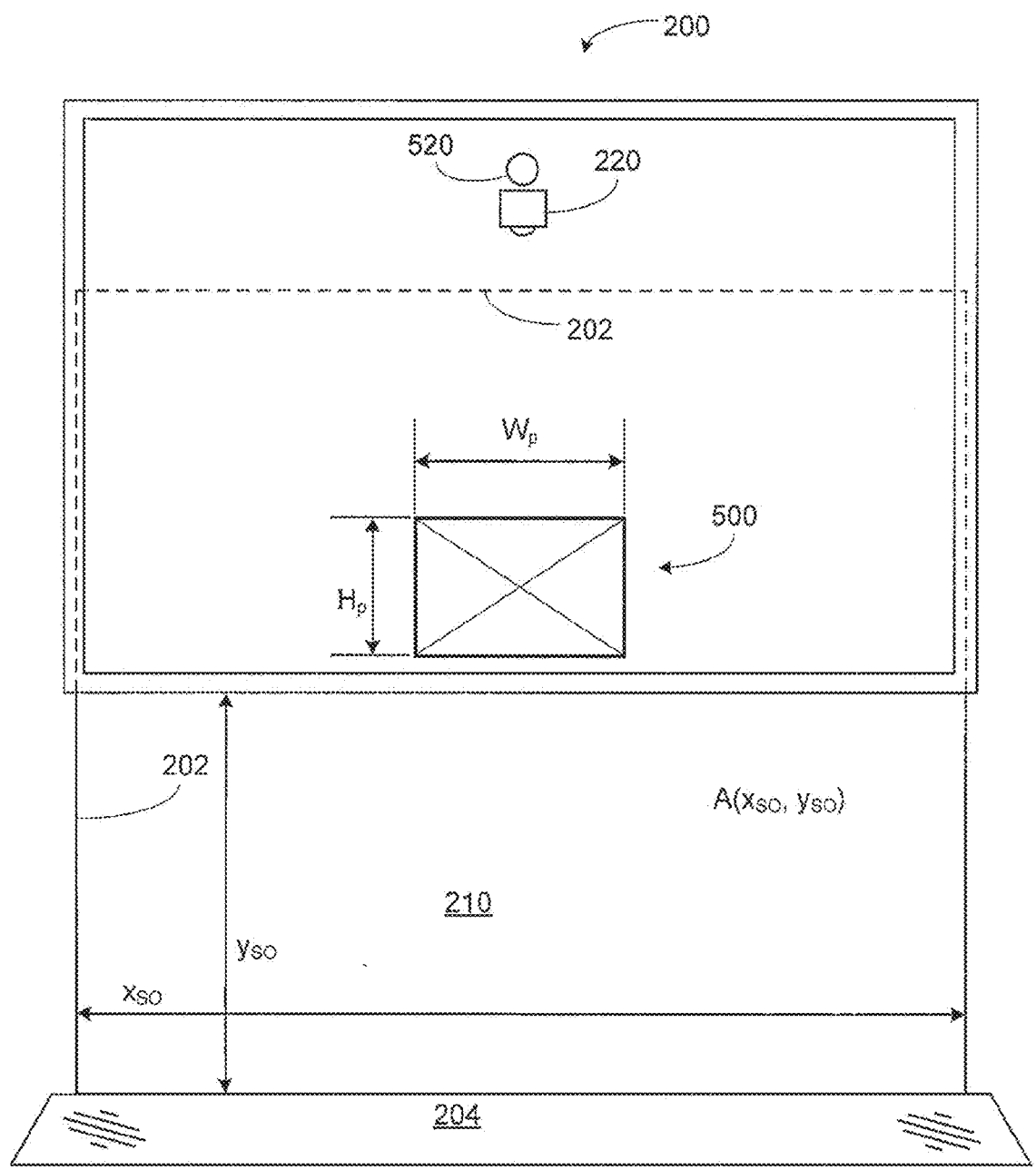
FIG. 5 is a rear perspective view of the sash panel and opening in the fume hood of FIG. 4 illustrating use of a glyph to aid in detecting and measuring sash opening edges.

The systems and methods for determining a sash opening area using a camera involve analyzing images captured by the camera 220 to detect the edges that form the sash opening 210. The detection of edges may be facilitated using markers at strategic locations, such as at edges likely to form sash openings. FIGS. 4 and 5 illustrate two examples illustrating how the edges may be identified using markers. It is noted that the invention is not limited to the use of the examples described with reference to FIGS. 4 and 5, or to the use of any markers. The edges forming the sash opening area may be determined and measured using any suitable process for determining real dimensional characteristics in an image.

In one example implementation, a reflective strip may be adhesively applied to an edge forming the sash opening. The reflective strip may be of a known length and position relative to the sash opening area. One example of the use of a reflective strip is illustrated in FIG. 4. FIG. 4 is a rear perspective view of the sash panel and opening in the fume hood of FIG. 2 illustrating use of a reflective strip 400 to aid in detecting and measuring sash opening edges. As shown in FIGS. 2-4, the sash opening area, $A(x_{sash}, y_{sash})$, is defined by the bottom edge of the sash panel 208, the side edges of the hood opening 202, and a line on the work surface 204 that is coplanar with the sash panel 208. The reflective strip 400 in FIG. 4 is applied on the work surface 204 along the line that is coplanar with the sash panel 208.

The sash opening area, $A(x_{sash}, y_{sash})$, may be determined by detecting the reflective strip 400 in an image captured by the camera 220. The reflective strip 400 is of a length that is known to the controller, or component that computes the sash opening area. The position of the reflective strip 400 in FIG. 4 is also known to be the bottom edge of the sash panel, which forms the top edge of the sash opening. During analysis of the image of the sash opening, the reflective strip 400 is identified as the bottom edge of the sash panel, and top edge of the sash opening. A first side edge 203a and a second side edge 203b are expected to extend perpendicularly from the ends of the reflective strip 400. During the analysis of the image, edges in the image that extend from the ends of the reflective strip 400 may be detected. The ends of the side edges 203a, 203b opposite the reflective strip 400 are expected to join the ends of a bottom edge 203c of the sash opening 210. The bottom edge of the sash opening 210 may be drawn into the image as a line connecting the ends of the side edges 203a, 203b on the work surface 204.

The length of the top edge 203c of the sash opening 400 may be the same as the length of the reflective strip 400. In typical fume hoods, the hood opening 202 is generally formed by horizontal and vertical edges. Accordingly, as the sash panel 208 moves up or down to vary the area of the sash opening 210, the sash opening 210 forms a rectangle with an area that varies only in the length of the side edges 203a, 203b. To determine the area of the sash opening 210, $A(x_{sash}, y_{sash})$, the length of the side edges 203a, 203b is determined in pixels in the captured image and used with the known lengths of the top edge 203c and the reflective strip 400 to calculate the area of the rectangle.

It is noted that fume hoods may not have hood openings 202 that conform to the assumption above regarding the vertical and horizontal orientation of the hood opening edges. For example, side edges 203a, 203b may slant at an angle, or may extend at a curve. Those of ordinary skill in the art will understand that the geometry of the sash opening is sufficiently predictable such that known parameters regarding the geometry of the sash opening enable calculation of the area of the sash opening.

The example marker-based method of determining the area of the sash opening 210 involves a reflective strip 400 along the bottom edge of the sash opening 210. The bottom edge of the sash opening 210 remains constant in location and length since the sash 208 is vertically movable and the bottom edge of the sash opening 210 lies on the work surface 204. Those of ordinary skill in the art will appreciate that marker-based methods may also be used in a similar manner in fume hoods having horizontally movable sashes, or both horizontally and vertically movable sashes as shown in FIGS. 1B and 1C. In the fume hood shown in FIG. 1C having both horizontally and vertically movable sashes, additional reflective strips may be added to provide a scale in the image. Multiple reflective strips may be used in any of the examples described herein as desired to assist in determining the area of the sash opening.

In an example implementation, the area of the sash opening is determined with the aid of an object of known dimensions positioned in the field of view of the camera 220 so that it will appear in the captured images used to determine the sash opening area. FIG. 5 is a rear perspective view of the sash panel 208 and hood opening 202 in the fume hood of FIG. 2. The sash panel 208 includes a scaling pattern 500, which may be a pattern that is stamped, etched, or drawn on the sash panel 208 in a manner that provides sufficient contrast to appear in the image captured to detect and measure sash opening edges. The scaling pattern 500 may also be formed by reflective material including a reflective tape, ink, or objects. The scaling pattern 500 may also be formed by an object positioned in the field of view of the camera 220 to ensure that it appears in the images captured to determine the area of the sash opening 210. The scaling pattern 500 has dimensions of height $H_p$ and width $W_p$ that are known to the controller or component that calculates the area of the sash opening 210. If the sash opening 210 has a geometric pattern that is different from a rectangle, the scaling pattern 500 may have a matching pattern. The scaling pattern 500 provides a scale embedded into the image that can be used to translate the pixel length in the image to a real unit length, or a pixel area to a real area.

FIGS. 4 and 5 illustrate examples of techniques that may be used to determine the area of a sash opening using an image captured by a camera. It is noted that other techniques may be used as well. The process may be enhanced by adding a light emitter to project light on to the hood opening, thereby illuminating the field of view of the camera. FIG. 5 includes a light emitter 520 positioned and mounted near the camera 220 to illuminate the hood opening 202. In an example implementation, the light emitter 520 may be an infrared light source, and the camera 220 may be a camera capable of detecting infrared radiation may be used to map the environment in the image captured.

III. System for Controlling Ventilation in a Fume Hood

As noted above, a controller may be provided, either integrated with the camera 220 (FIG. 2), or connected to receive digital representations of the images captured by the camera 220 and use the images to determine the area of the sash opening or openings. In addition, the fume hood may include, or be connected to, an exhaust fan and damper arrangement (not shown). The controller may be incorporated in a system for controlling the ventilation in the fume hood. Alternatively, the controller may be configured to communicate with a room ventilation control system that may be configured to control the ventilation in the fume hood. Regardless of how the different functions and components are distributed or packaged, the systems and methods for determining the area of a sash opening may be configured to operate in a system for controlling ventilation in a fume hood.

Figure 6:
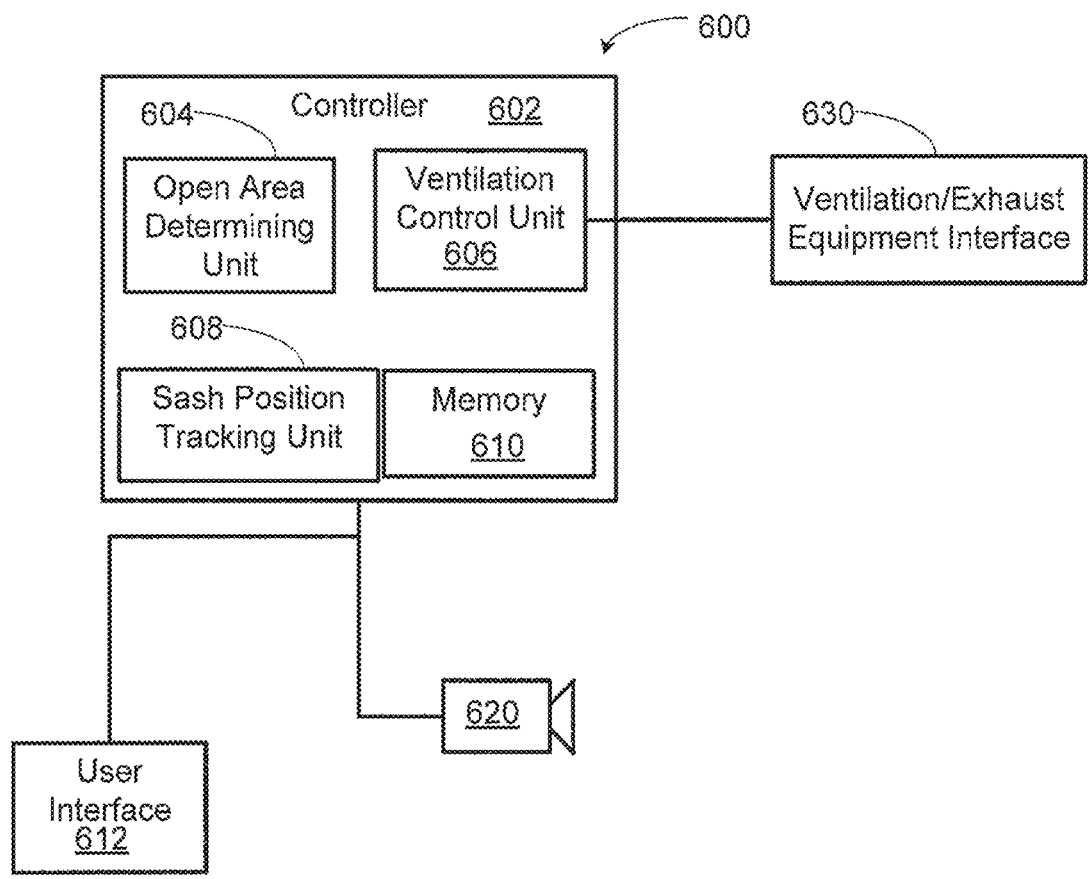
FIG. 6 is a block diagram of a system for controlling ventilation in a fume hood.

FIG. 6 is a block diagram of an example of a system 600 for controlling ventilation in a fume hood. The system 600 in FIG. 6 includes a controller 602 configured to perform functions that include (without limitation):

an open area determining unit 604,
a ventilation control unit 606, and
a sash position tracking unit 608.

The controller 602 may also include memory 610 and connections to user interface devices 612. The controller 602 may also have a connection to a camera 620, which may be a video camera or a still picture camera. The ventilation control unit 606 may include an interface to ventilation/exhaust equipment 630.

The controller 602 may perform the function of tracking the sash position using the sash position tracking unit 608 by receiving images captured by the camera 620, which may be configured to capture images as described above with reference to FIGS. 2-5. An example of the sash position tracking unit 608 may be configured to determine the edges of the sash opening (such a sash opening 202 in FIG. 2) that define the opening of the fume hood at a given time. The edge detection may be performed using markers as described above with reference to FIGS. 4 and 5. A markerless detection system as described below with reference to FIGS. 7A and 7B may also be used.

The information regarding the edges defining the sash opening may be communicated to the open area determining unit 604. The open area determining unit 604 determines an area of the sash opening based on the information about the edges of the opening determined by the sash position tracking unit 608. As discussed above, a pixels/unit length may be determined in calibration or as a pre-determined value. Other known characteristics may be provided to permit the area determining unit 604 to determine the area of the sash opening based on the known parameters, geometry of the sash opening, and orientation of the sash panel(s) and the camera.

The ventilation control unit 606 uses the area of the sash opening to control the ventilation in the fume hood so that the face velocity is maintained within a desired range. The ventilation control unit 606 may communicate with ventilation/exhaust equipment through a ventilation/exhaust equipment interface 630 to adjust fans and dampers as determined by the ventilation control unit 606. The actual algorithms for determining the proper settings of the fans and/or dampers for a desired range of face velocity are well known to those of ordinary skill in the art and, therefore, need not be discussed in any further detail.

IV. Marker-Less Sash-Opening Area Detection

Figure 7A:
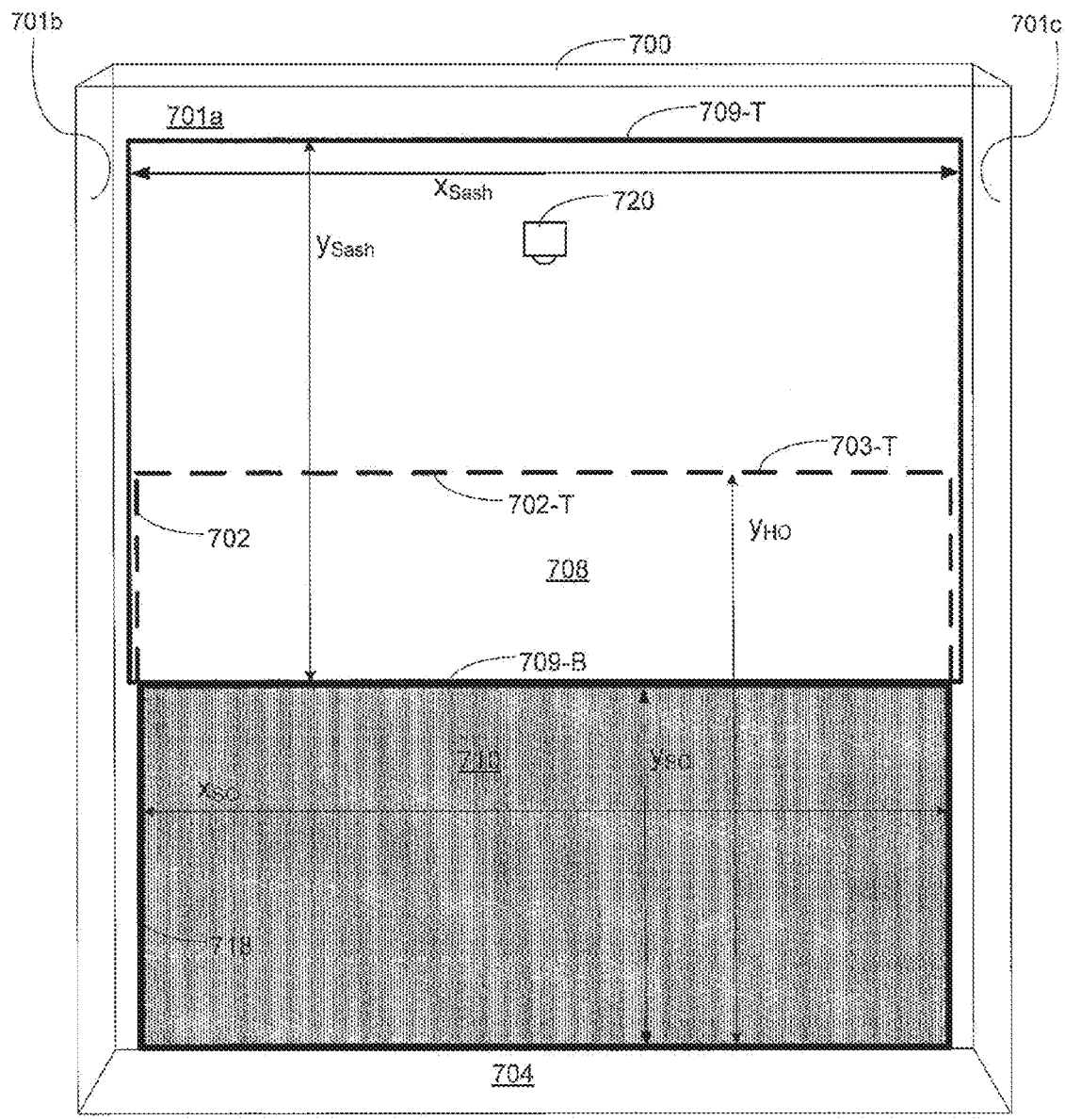
FIGS. 7A and 7B are schematic views of an image of the sash panel and opening in the fume hood of FIG. 4 illustrating use of an image model of the sash opening to aid in detecting and measuring sash opening areas.
Figure 7B:
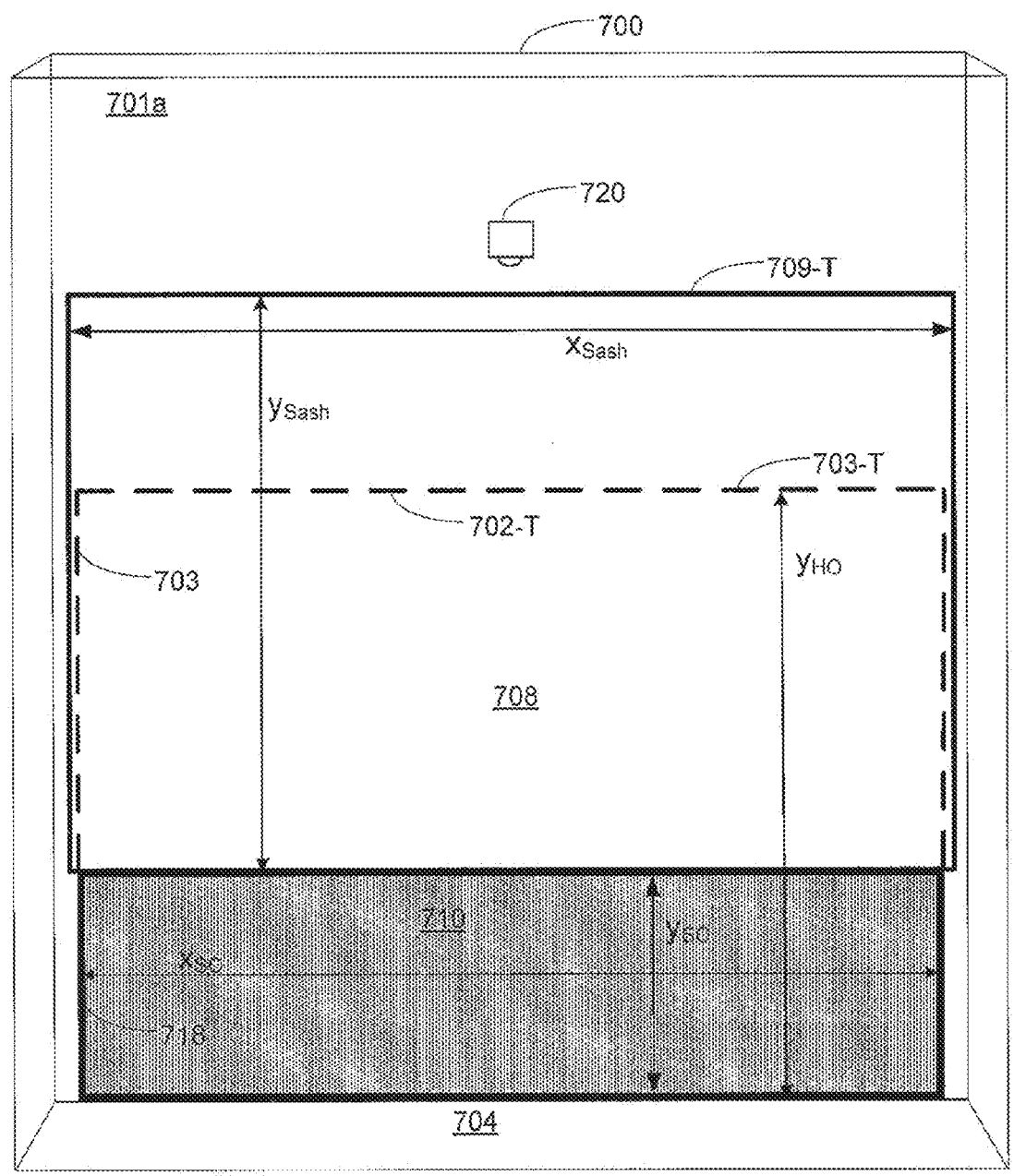

As described above, the methods described above with reference to FIGS. 4 and 5 are marker-based methods. That is, they use markers in the form of reflective strips or scaling patterns to provide given information in the image that translates to the dimensions in the real fume hood environment. FIGS. 7A and 7B are rear perspective views of the sash panel and opening in the fume hood of FIG. 2 illustrating use of an image model of the sash opening to aid in detecting and measuring sash opening areas.

FIGS. 7A and 7B are schematic views of an image of an enclosure space 700 of an example of the fume hood 100 shown in FIG. 1A. The enclosure space image 700 in FIGS. 7A and 7B is formed by a front inner wall image 701a, a left inner wall image 701b, a right inner wall image 701c, and a rear inner wall image 701d (shown in FIG. 8A). A hood opening image 702 is formed on the front inner wall image 701a of the enclosure structure image 700. A vertically movable sash image 708 that represents a sash panel similar to the vertically movable sash 108 on the fume hood 100 of FIG. 1A is illustrated as movable along the front inner wall image 701a of the enclosure structure image 700 to vary the area, $A(x_{SO}, y_{SO})$, of a sash opening image 710 of width $x_{SO}$ and height $y_{SO}$. A work surface image 704 forms the bottom of the enclosure space image 700. The motion of the sash panel is illustrated by changes of position of the sash panel image 708 from image to image, such as from FIG. 7A to FIG. 7B.

FIGS. 7A and 7B also show image models for components in the image that are measured to determine an area of the sash opening image 710. The image models include a hood opening image model 703, a sash panel image model 709, and an opening image model 718. The image models 703, 709, and 718 may be configured and maintained as parameters or specifications that define the components they represent. For example, the dimensions of the sash panel 708 may be known beforehand, or determined in a calibration step, and stored as parameters $x_{Sash}$ and $y_{Sash}$. The dimensions of the hood opening corresponding to the hood opening image 702 may also be known and stored as parameters $y_{HO}$ and $x_{HO}$. The parameters may be stored as data models that define the respective sash and hood opening components. In addition, the data models may include information defining the position of the sash panel image 708 relative to the hood opening image 702 when the sash panel image 708 is in a position for a fully closed fume hood, and when the sash panel image 708 is in a position for a fully open fume hood. An image data model may also be constructed for the sash opening image 710 based on the dimensions of the sash panel corresponding to the sash panel image 708 and the hood opening corresponding to the hood opening image 702, which may include information such as a maximum area and/or dimensions of the sash opening image 710 and a description of the space in which the sash opening image 710 may appear.

The data models of the components of the fume hood enclosure structure image 700 may be stored and applied to an image in order to determine how the position of the sash panel image 708 has changed. An image captured by the camera 720 may be analyzed to detect all edges that appear in the image. Pixel length measurements of the edges, and distances between the various edges are compared with the information in the data models configured for each component. Once the components and their positions are identified, a perimeter may be drawn on the image representing each component and opening. The rectangles that represent the sash panel image 708, the hood opening image 702, and the sash opening image 710 are drawn in FIGS. 7A and 7B as the hood opening image model 703, the sash panel image model 709, and the sash opening image model 718. It is noted that the image models 703, 709, and 718 are not physical objects in the hood opening 702 environment. The image analysis functions know that the image represents a particular structure, but that the components in the structure may have changed positions. If the image were displayed, the image models 703, 709, and 718 would appear as illustrated by FIGS. 7A and 7B once the components and their positions were identified. FIG. 7B shows how the appearance of the image models 703, 709, and 718 would change after the position of the sash panel image 708 has changed. For each image analyzed, the image processing functions determine the position changes by fitting the data image models to each subsequent image.

In operation, the function of determining the area of the sash opening image 710 may not require any display of the images captured and used in determining the area. In determining the area of the sash opening, the image model 718 is constructed as a data structure or data object that has determined dimensions $x_{SO}$ and $y_{SO}$, which are then used to determine the area of the sash opening 710.

Other data may be added to the image model data. For some implementations, certain aspects are fixed or at least predictable based on assumptions about the fume hood.

Figure 8A:
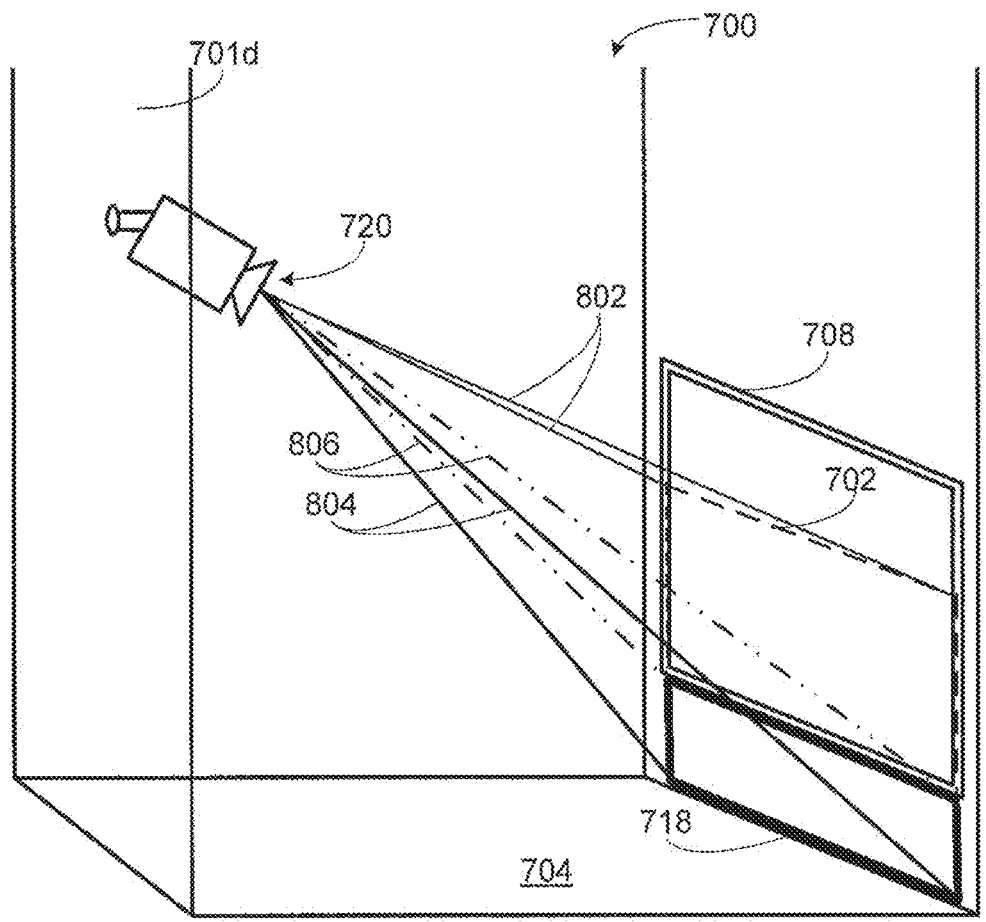
FIGS. 8A and 8B are a rear side perspective view of the scheme illustrated by FIGS. 7A and 7B.
Figure 8B:
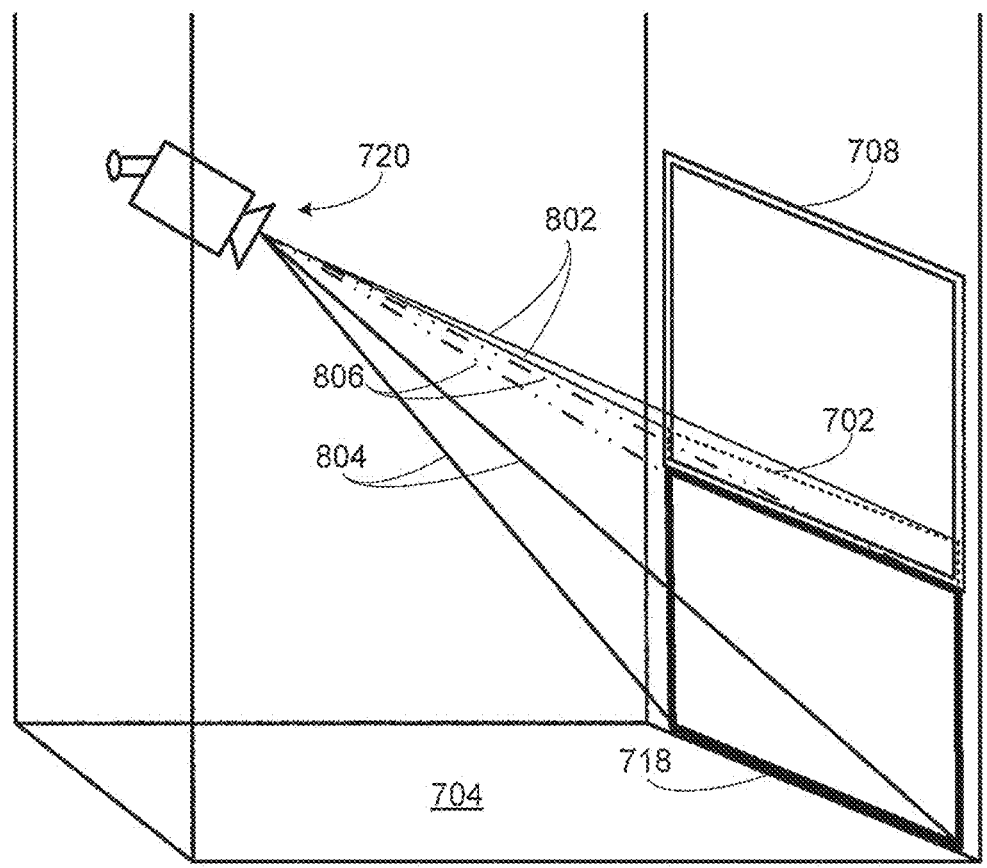

FIGS. 8A and 8B are rear side perspective views of the fume hood illustrated in FIGS. 7A and 7B. FIGS. 8A and 8B illustrate how the sash opening image model 718 may be mapped on to the image of the hood opening 702. The hood opening 702 may be defined in the image by a view indicated by lines 802 and 804. The image model 718 may be defined in the image by a view indicated by lines 804 and 806.

Figure 7C:
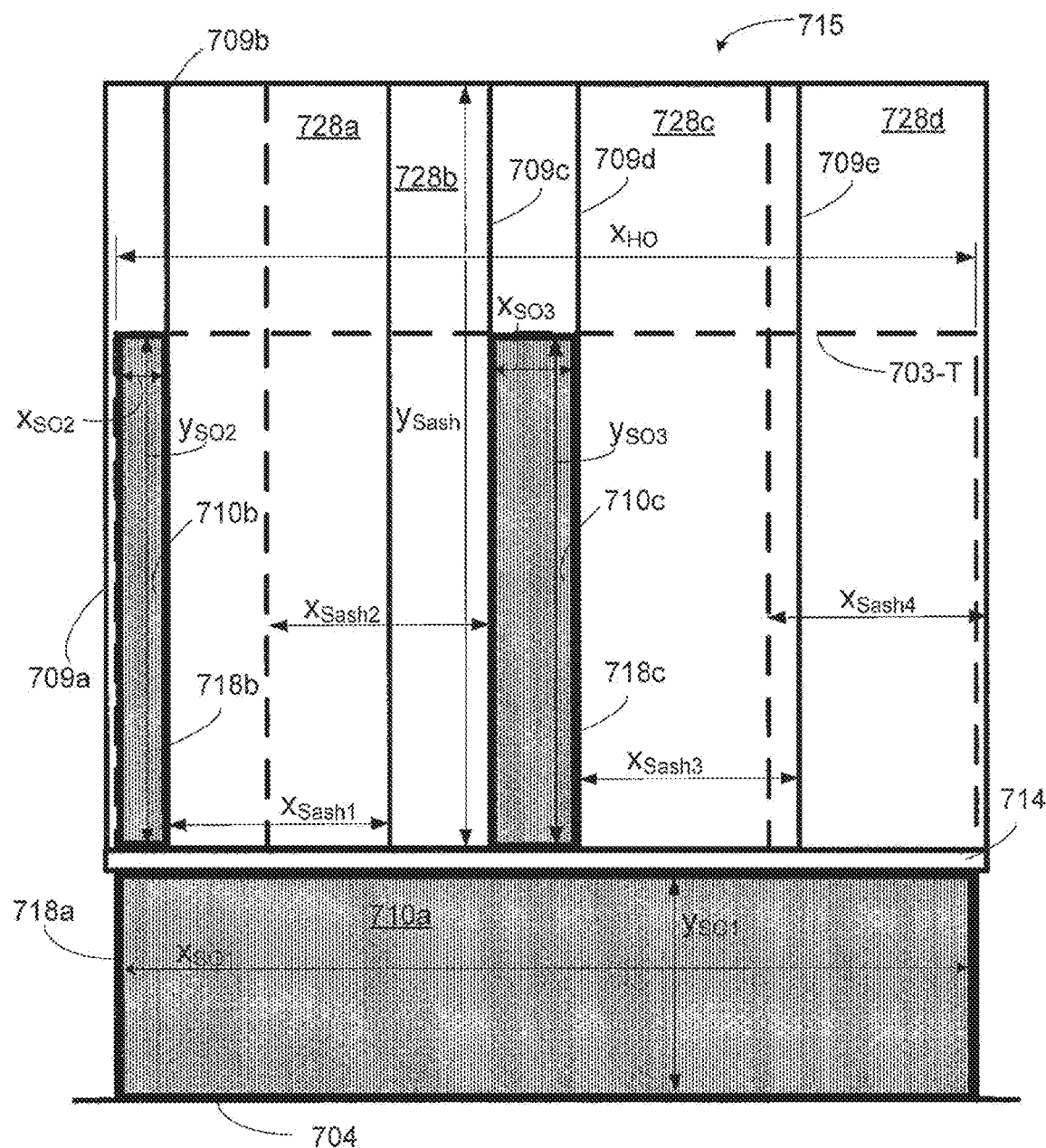
FIG. 7C is a schematic view of an image of a fume hood that uses a vertically movable sash partition with horizontally movable sash panels illustrating use of an image model of the sash panels and hood opening to detect and measure multiple sash opening areas.

It is noted that the examples of using data image models to determine the area of openings in a fume hood shown in FIGS. 7A and 7B are simplified to illustrate operation of the use of data image models. FIG. 7C is a schematic view of an example of an image 715 of a fume hood similar to the fume hood enclosure 230 described above with reference to FIG. 2C. The image 715 in FIG. 7C shows a vertically movable sash section image 714 and horizontally movable sash panel images 728a, 728b, 728c, and 728d, which move vertically with the vertical movement of the vertically movable sash panel 240 (FIG. 2C). The image also shows a hood opening image 702 and a work surface image 704. The components that appear in the image may be detected and identified by edge detection and application of data image models for each component as described above with reference to FIGS. 7A and 7B.

The data image models for components in the image 715 in FIG. 7C include a sash section image model 709a, a first horizontally movable sash panel image model 709b, a second horizontally movable sash panel image model 709c, a third horizontally movable sash panel image model 709d, a fourth horizontally movable sash panel image model 709e, and a hood opening image model 703. The dimensions of each image model 709a-e and 703 may be measured in pixels, and then translated to unit length using a scaling value as described above with reference to FIGS. 2A-2C. The image model may then be determined for any sash openings formed by the position of the sash section image 714 and the horizontally movable sash panel images 728a-d. The image 715 in FIG. 7C illustrates three sash opening images represented by a first sash opening image model 710a, a second sash opening image model 710b, and a third sash opening image model 710c. The areas of each sash opening may be determined based on the pixel lengths of the edges forming each sash opening image model 710a-c.

An advantage of using the marker-less implementation as illustrated by FIGS. 7A and 7B is that example implementations may be made robust enough to track in three dimensions. The image models may be constructed to have 3-D features and the change in position (or motion) of object modeled by the image model may be tracked by predicting poses from image to image, or frame to frame (particularly useful if capturing video images). Tracking in 3-D may be particularly advantages if the sash panels are implemented to swing open, or if multiple openings are used on a particular fume hood. Image models may also be designed to include more features. An image model of the entire fume hood interior, or one face of the fume hood, may also be constructed and the sash opening identified as one component of the image model.

V. Methods for Measuring Sash Opening Area

Figures 9A, 9B:
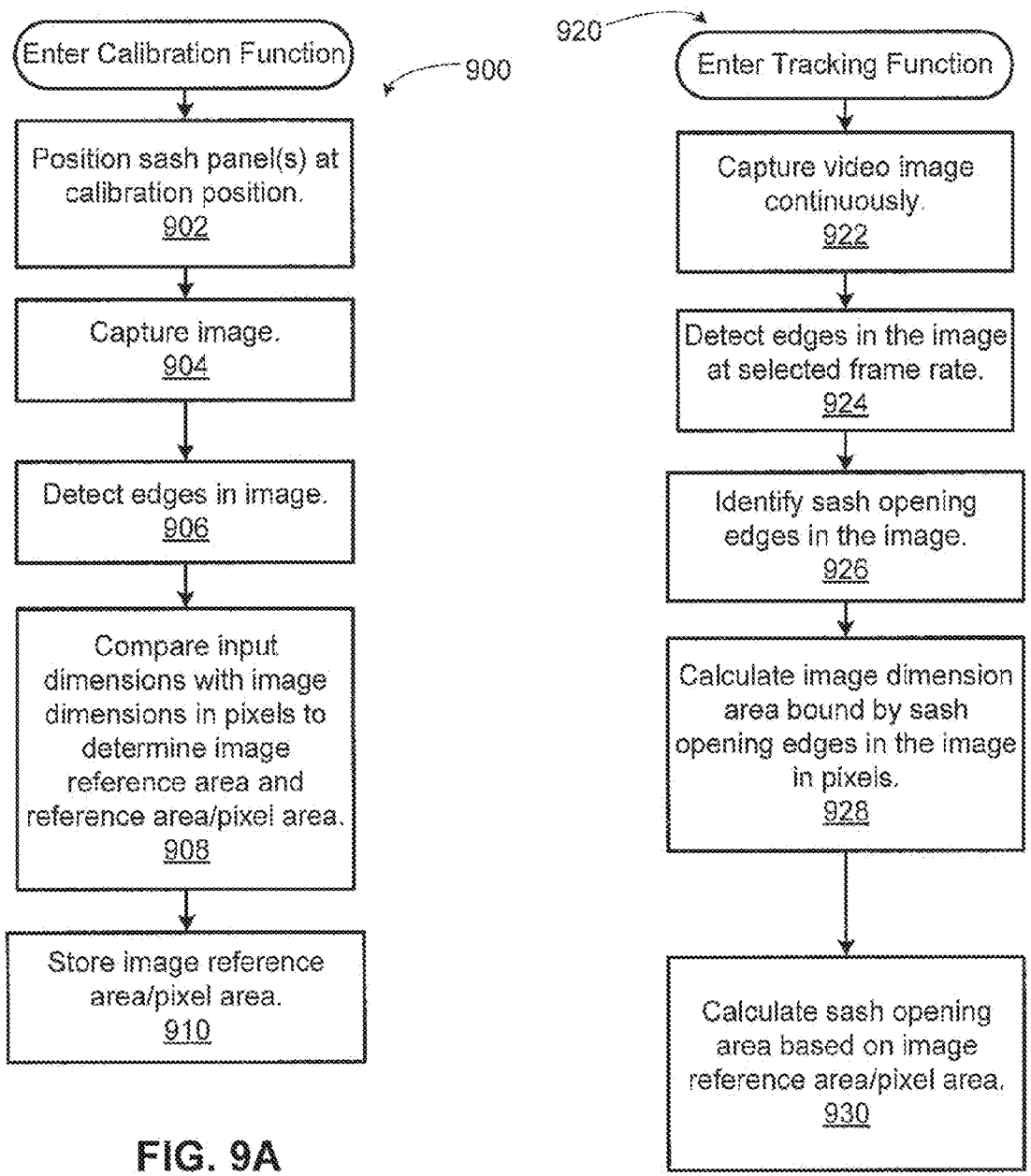
FIG. 9A is a flowchart illustrating operation of a calibration function for calibrating a system for measuring the area of a sash opening using images captured by a camera.
FIG. 9B is a flowchart illustrating operation of a tracking function for measuring the area of a sash opening using images captured by a camera.

FIG. 9A is a flowchart illustrating operation of a calibration function 900 for calibrating a system for measuring the area of a sash opening using images captured by a camera. The calibration function 900 may be performed before tracking the position of the sash panel to determine any parameters that may be used to calculate the area of the sash opening. At step 902 the sash panel is positioned at a calibration position. The calibration position may be any position that provides a reference length between x=0 (and/or y=0) and $y=y_{Max}$ (and or $x=x_{Max}$). In one example, the reference length may be set for a fully open sash opening such that the area of the sash opening is at its maximum.

At step 904, an image is captured at calibration position. At step 906, the image is analyzed to identify any edges in the image. Image detection is a well-known process in image processing. It is noted that video or imaging settings may be adjusted to ensure that the edges appear with the best possible contrast. For example, the image may be filtered to isolate edges such that pixels having intensities above a certain threshold are set to maximum intensity. Also at step 906, the edges in the image may be analyzed to identify edges associated with the sash opening. For example, the edges of relevance may be expected to be positioned in a certain part of the image.

At step 908, the edges of the sash opening are measured in pixels. The actual length of the edges at the calibration position is known. Using the number of pixels and the actual length, a pixel/unit length value may be determined such that a line on an image may be translated to an actual length in the real environment of the fume hood. A pixel/unit length value may be determined for each of the x and y directions as well as for edges along certain angles. The different pixel/unit length values for each dimension accounts for the motion of the sash panel along a plane at an angle from the angle of the image plane. Also at step 908, an area/pixel$^2$ area may be determined. At step 910, the pixels/unit length values for each dimension and angle, and the area/pixel$^2$ values may be stored.

FIG. 9B is a flowchart illustrating operation of a tracking function for measuring the area of a sash opening using images captured by a camera. The flowchart in FIG. 9B illustrates operation of a tracking function 920 that employs a camera that captures video images. At step 922, video is captured continuously. Using a video camera, the tracking function 920 may be programmed to analyze frames periodically. For example, the video may be received by a controller (such as the controller 600 shown in FIG. 6) and the tracking function may be invoked to check the position of the sash for as many as ten frames or more in a second. Much slower rates may be used as well such as one frame per two seconds, or even 90 seconds. The video camera may also capture images continuously and the tracking function may be invoked to track images in frames when a detector detects that the sash panels have moved. The tracking function 920 may be programmed to perform according to a wide variety of schedules based on the particular environment of the fume hood in which it is operating.

At step 924, the image in a selected frame may be analyzed to detect edges. At step 926, edges defining the sash opening are identified. At step 928, the pixel area of the area bound by the edges in the image is calculated in terms of pixels. The length of each edge in pixels may be calculated instead, or in addition. At step 930, the real dimensions of the edges defining the sash opening are calculated based on the pixels/unit length values for each dimension and/or angle of the edges. The area of the sash opening may also be determined based on the area/pixel$^2$ value.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A system for determining the area of a sash opening in a fume hood formed by at least one movable sash panel mounted over a hood opening to an enclosure structure of the fume hood to reduce the area of the sash opening when the at least one sash panel is moved in one direction or to expand the area of the sash opening when moved in the other direction to provide access to a work surface in the fume hood enclosure space, the system comprising:
    a camera mounted in a fume hood enclosure space to capture an image of at least a portion of the hood opening;
    an area determining function configured to receive a digital representation of the image, to analyze the image by detecting edges in the image, to identify image edges corresponding to edges of the sash opening, and to determine the area of the sash opening by applying a scaling value to the area formed by the image edges corresponding to the area of the sash opening.

2. The system of claim 1 further comprising a marker positioned to appear in the image, the marker having a surface that is sufficiently light reflective to appear in the image and at least one known length along at least one dimension.

3. The system of claim 2 where the marker comprises a reflective strip having a known length and mounted in the fume hood in a position that indicates a real length of at least one of the edges of the sash opening to translate the real length to a number of pixels in the image.

4. The system of claim 3 where the reflective strip is mounted to coincide with at least one of the edges of the sash opening such that the known length of the reflective strip is the real length of the at least one of the edges of the sash opening.

5. The system of claim 4 where the reflective strip is mounted to coincide with an edge of the sash opening that remains constant in length in position where the sash panel is movable in either a vertical or a horizontal direction.

6. The system of claim 2 where the marker comprises a scaling pattern having a known real length height and a real length width, the scaling pattern mounted to appear in the image of the fume hood.

7. The system of claim 6 where the scaling pattern is formed by an object positioned in the field of view of the camera.

8. The system of claim 1 where the area determining function is further configured to generate an image model corresponding to an area defined by the edges of the sash opening, and to map the image model on image edges corresponding to the edges of the sash opening.

9. The system of claim 8 where the camera captures video images and the area determining function is performed on image frames at a selected rate.

10. The system of claim 1 where the camera is either, a video camera where the area determining unit analyzes image frames, or a still-image camera.

11. The system of claim 1 where the area determining unit further comprises an interface with a ventilation control function, where the area determining unit communicates the determined area of the sash opening to the ventilation control unit, and where the ventilation control unit controls ventilation in the fume hood to maintain a face velocity at the fume hood opening within a desired range.

12. The system of claim 1 further comprising a light emitter to illuminate the field of view of the camera.

13. The system of claim 12 where the light emitter emits infrared and the camera is an infrared camera.

14. The system of claim 1 where the camera is an infrared camera.

15. A method for determining an area of a sash opening in a fume hood formed by at least one movable sash panel mounted over a hood opening to an enclosure structure of the fume hood to reduce the area of the sash opening when the at least one sash panel is moved in one direction or to expand the area of the sash opening when moved in the other direction to provide access to a work surface in the fume hood enclosure space, the method comprising:
    providing a camera in the fume hood enclosure structure positioned to include at least a portion of the hood opening in a field of view of the camera;
  capturing an image of the sash opening;
    detecting image edges in a digital representation of the captured image;
    identifying the image edges in the digital representation that correspond to edges of the sash opening;
    determining an area of the sash opening based on real lengths of the edges of the sash opening by applying a scaling value that translates a number of pixels to a real length.

16. The method of claim 15 further comprising:
  providing a marker having at least one known real length along at least one dimension, the marker positioned within the field of view of the camera; and
  determining the scaling value based on a pixel length of the marker in the image along the at least one dimension of the known real length.

17. The method of claim 16 where the marker is a reflective strip of a known real length, the method further comprising:
    mounting the reflective strip to coincide with an edge of the sash opening having a real length equal to a maximum length of the edge of the sash opening.

18. The method of claim 15 further comprising:
  providing a scaling pattern as the marker, the scaling pattern having a known real length height and a real length width; and
  mounting the scaling pattern to appear in the image of the fume hood.

19. The method of claim 15 further comprising a step of:
  generating an image model corresponding to an area defined by the edges of the sash opening;
  where the step of identifying the image edges that correspond to edges of the sash opening further comprises mapping the image model on image edges corresponding to the edges of the sash opening.

20. The method of claim 19 where the camera is configured to capture video images comprising a series of image frames, the method further comprising:

performing the steps of capturing the image, detecting the image edges, identifying the image edges, and determining the area of the sash opening at a predetermined rate to track the movement of the sash panels.

* * * * *